US00RE47656E

(19) United States
(12) Reissued Patent
Bae et al.

(10) Patent Number: US RE47,656 E
(45) Date of Reissued Patent: Oct. 22, 2019

(54) OPTICAL ASSEMBLY, BACKLIGHT UNIT AND DISPLAY APPARATUS THEREOF

(71) Applicant: LG ELECTRONICS INC., Seoul (KR)

(72) Inventors: Seung Choon Bae, Pyeongtaek-si (KR); Sung Woo Kim, Pyeongtaek-si (KR); Soon Hyung Kwon, Pyeongtaek-si (KR); Bup Sung Jung, Pyeongtaek-si (KR); Sang Tae Park, Pyeongtaek-si (KR); Bu Wan Seo, Pyeongtaek-si (KR)

(73) Assignee: LG ELECTRONICS INC., Seoul (KR)

(21) Appl. No.: 14/604,466

(22) Filed: Jan. 23, 2015

Related U.S. Patent Documents

Reissue of:
(64) Patent No.: 8,672,498
Issued: Mar. 18, 2014
Appl. No.: 12/698,886
Filed: Feb. 2, 2010

U.S. Applications:
(60) Provisional application No. 61/237,587, filed on Aug. 27, 2009.

(30) Foreign Application Priority Data

Aug. 27, 2009 (KR) ..... 10-2009-0079700
Aug. 27, 2009 (KR) ..... 10-2009-0079710
(Continued)

(51) Int. Cl.
*G09F 13/04* (2006.01)
*G02F 1/1335* (2006.01)
*F21V 8/00* (2006.01)

(52) U.S. Cl.
CPC .. *G02F 1/133603* (2013.01); *G02F 1/133606* (2013.01); *G02B 6/0073* (2013.01)

(58) Field of Classification Search
CPC ..... G02F 1/133603; G02F 1/133605; G02F 1/133606; G02F 1/133611;
(Continued)

(56) References Cited

U.S. PATENT DOCUMENTS 3,752,974 A 8/1973 Baker et al.
5,708,486 A 1/1998 Miyawaki et al.
(Continued)

FOREIGN PATENT DOCUMENTS

EP 1 992 871 A2 11/2008
EP 2 063 296 A2 5/2009
(Continued)

*Primary Examiner* — Henry N Tran
(74) *Attorney, Agent, or Firm* — Birch, Stewart, Kolasch & Birch, LLP

(57) ABSTRACT

The present invention relates to an optical assembly, a backlight unit, and a display apparatus thereof. According to an embodiment of the present invention, an optical assembly includes a first layer, a plurality of light sources disposed over the first layer, a second layer that is disposed above the first layer and covering the plurality of light sources, and a pattern layer disposed above or in the second layer, wherein the pattern layer includes a plurality of patterns disposed at positions substantially corresponding to the light sources.

16 Claims, 24 Drawing Sheets

(30) Foreign Application Priority Data

Aug. 28, 2009 (KR) ..... 10-2009-0080249
Nov. 24, 2009 (KR) ..... 10-2009-0114225
Nov. 24, 2009 (KR) ..... 10-2009-0114226
Nov. 24, 2009 (KR) ..... 10-2009-0114227

(58) Field of Classification Search
CPC ..... G02F 2001/133601; G02F 2001/133613; H04J 14/0206; G02B 6/0021; G02B 6/0036; G02B 6/0041; G02B 6/0061; G02B 6/0068; G02B 6/0073; G02B 6/0078
USPC ..... 362/97.1, 97.3, 240, 241, 247, 249.02; 345/102
See application file for complete search history.

(56) References Cited

U.S. PATENT DOCUMENTS

| | | | | |
|---|---|---|---|---|
| 6,960,010 | B2 | 11/2005 | Matsumoto et al. | |
| 7,467,877 | B2 | 12/2008 | Peng et al. | |
| 7,588,364 | B2 | 9/2009 | Kitamura et al. | |
| 7,641,352 | B2 | 1/2010 | Lin et al. | |
| 7,710,016 | B2 | 5/2010 | Miki et al. | |
| 7,784,954 | B1 | 8/2010 | Coleman | |
| 8,657,480 | B2 * | 2/2014 | Lee | G02B 6/0053 362/625 |
| 2003/0223217 | A1 | 12/2003 | Wright et al. | |
| 2004/0105247 | A1 | 6/2004 | Calvin et al. | |
| 2005/0265029 | A1 | 12/2005 | Epstein et al. | |
| 2006/0002146 | A1 | 1/2006 | Baba | |
| 2006/0007103 | A1 | 1/2006 | Oh et al. | |
| 2006/0028842 | A1 * | 2/2006 | Kim et al. | G02B 6/0018 362/612 |
| 2006/0044240 | A1 | 3/2006 | Takizawa et al. | |
| 2006/0044830 | A1 | 3/2006 | Inoue et al. | |
| 2006/0083020 | A1 | 4/2006 | Tai et al. | |
| 2006/0139960 | A1 | 6/2006 | Sakai et al. | |
| 2006/0164840 | A1 | 7/2006 | Song et al. | |
| 2006/0256255 | A1 | 11/2006 | Minami | |
| 2006/0268567 | A1 | 11/2006 | Jang et al. | |
| 2006/0290840 | A1 | 12/2006 | Bang et al. | |
| 2007/0019394 | A1 | 1/2007 | Park et al. | G02B 6/0018 362/23.18 |
| 2007/0058358 | A1 | 3/2007 | Chikazawa et al. | |
| 2007/0086179 | A1 | 4/2007 | Chen et al. | |
| 2007/0147073 | A1 * | 6/2007 | Sakai et al. | 362/607 |
| 2007/0247833 | A1 | 10/2007 | Lee et al. | |
| 2008/0080180 | A1 | 4/2008 | Messina et al. | |
| 2008/0291152 | A1 | 11/2008 | Nakao et al. | |
| 2008/0319715 | A1 | 12/2008 | Kim et al. | |
| 2009/0003002 | A1 | 1/2009 | Sato | |
| 2009/0115713 | A1 | 5/2009 | Kakinuma et al. | |
| 2009/0129058 | A1 | 5/2009 | Tokita et al. | |
| 2009/0160756 | A1 | 6/2009 | Van Beek et al. | |
| 2009/0180282 | A1 | 7/2009 | Aylward et al. | |
| 2009/0207339 | A1 | 8/2009 | Ajichi et al. | |
| 2009/0213571 | A1 * | 8/2009 | Jin et al. | 362/97.1 |
| 2010/0060818 | A1 | 3/2010 | Ajichi et al. | |
| 2010/0265432 | A1 | 10/2010 | Masuda et al. | |

FOREIGN PATENT DOCUMENTS

| | | | |
|---|---|---|---|
| EP | 2241800 | A1 | 10/2010 |
| GB | 2 448 564 | A | 10/2008 |
| JP | 6-94920 | A | 4/1994 |
| JP | 7-235207 | A | 9/1995 |
| JP | 2006-318700 | A | 11/2006 |
| JP | 2007-011359 | A | 1/2007 |
| JP | 2008-27886 | A | 2/2008 |
| JP | 2008-140653 | A | 6/2008 |
| KR | 20-1999-0023724 | U | 7/1999 |
| KR | 10-2005-0045446 | A | 5/2005 |
| KR | 10-2005-0070628 | A | 7/2005 |
| KR | 10-2005-0112952 | A | 12/2005 |
| KR | 10-2006-0031518 | A | 4/2006 |
| KR | 10-2006-0049253 | A | 5/2006 |
| KR | 10-2006-0074845 | A | 7/2006 |
| KR | 10-2006-0123965 | A | 12/2006 |
| KR | 10-2007-0048888 | A | 5/2007 |
| KR | 10-2008-0054177 | A | 6/2008 |
| KR | 10-2009-0041797 | A | 4/2009 |
| KR | 10-2009-0071912 | A | 7/2009 |
| KR | 10-2009-0073452 | A | 7/2009 |
| KR | 10-2009-0078763 | A | 7/2009 |
| WO | WO 2008/139353 | A1 | 11/2008 |
| WO | 2009/016950 | A1 | 2/2009 |
| WO | 2009/098809 | A1 | 8/2009 |

* cited by examiner

OPTICAL ASSEMBLY, BACKLIGHT UNIT AND DISPLAY APPARATUS THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[Pursuant to] *This application is a reissue application of U.S. Pat. No. 8,672,498 issued on Mar. 18, 2014, which claims the benefit and right of priority under* 35 U.S.C. §119(a) or §119(e)[, this application claims the benefit of earlier filing date and right of priority] to Korean Application Nos. 10-2009-0079700, filed on Aug. 27, 2009, 10-2009-0079710 filed on Aug. 27, 2009, 10-2009-0080249 filed on Aug. 28, 2009, 10-2009-0114226 filed on Nov. 24, 2009, 10-2009-0114227 filed on Nov. 24, 2009, and 10-2009-0114225 filed on Nov. 24, 2009 and U.S. Provisional Application No. 61/237,587 filed on Aug. 27, 2009. [Each of these applications are hereby incorporated by reference herein in their entirety.]

FIELD OF THE INVENTION

The present invention relates to an optical assembly, a backlight unit, and a display apparatus thereof.

DISCUSSION OF THE RELATED ART

With development of an information society, a requirement for a display apparatus is also being increased in various forms. Various display apparatuses such as a liquid crystal display (LCD) apparatus, a plasma display panel (PDP), an electro luminescent display (ELD), a vacuum fluorescent display (VFD), etc. have been recently researched and used by complying with the requirement.

Among various display apparatuses, a liquid crystal panel of the LCD includes a liquid crystal layer, and a TFT substrate and a color filter substrate that are opposed to each other with the liquid crystal layer interposed therebetween. Since the liquid crystal panel has no self-luminous intensity, the liquid crystal panel can display an image by using light provided from a backlight unit. As the backlight unit, a florescent lamp disposed along one side of the LCD can be used. However, such a backlight unit has a limitation of producing an LCD device that may not be slim.

SUMMARY OF THE INVENTION

An object of the present invention is to provide a backlight unit capable of improving an image quality of a display picture and a backlight unit and a display apparatus thereof.

Another object of the present invention is to provide a backlight unit, an optical assembly, and a display apparatus, which address the limitations and disadvantages associated with the related art.

According to an aspect of the present invention, a backlight unit can reduce the thickness of a display apparatus and improve an exterior while simplifying a manufacturing process of the display apparatus by closely contacting the backlight unit to a display panel.

Further, it is possible to provide light having uniform luminance to the display panel by disposing the backlight unit so that a plurality of light sources emit in different directions. Accordingly, it is possible to improve the image quality of the display picture.

According to another aspect, the present invention provides an optical assembly, comprising: a first layer; a plurality of light sources disposed over the first layer; a second layer that is disposed above the first layer and covering the plurality of light sources; and a pattern layer disposed above or in the second layer, wherein the pattern layer includes a plurality of patterns disposed at positions substantially corresponding to the light sources.

According to another aspect, the present invention provides an optical assembly, comprising: a first layer; a plurality of light sources disposed over the first layer; and a second layer disposed above the first layer and covering the plurality of light sources, the second layer including a plurality of patterns for selectively reflecting light emitted from the plurality of light sources, wherein the plurality of patterns are disposed at positions corresponding substantially to the plurality of light sources.

According to another aspect, the present invention provides a backlight unit, comprising at least one optical assembly including: a first layer; a plurality of light sources disposed over the first layer; a second layer that is disposed above the first layer and covering the plurality of light sources; and a pattern layer disposed above or in the second layer, wherein the pattern layer includes a plurality of patterns disposed at positions substantially corresponding to the light sources.

According to another aspect, the present invention provides a display apparatus, comprising: a backlight unit including at least one optical assembly; and a display panel positioned above the backlight unit, wherein the backlight unit is divided into a plurality of blocks and is selectively drivable for the divided blocks. The optical assembly includes a first layer; a plurality of light sources disposed over the first layer; a second layer that is disposed above the first layer and covering the plurality of light sources; and a pattern layer disposed above or in the second layer, wherein the pattern layer includes a plurality of patterns disposed at positions substantially corresponding to the light sources.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF PREFERRED EMBODIMENTS

In the following detailed description, reference is made to the accompanying drawing figures which form a part hereof, and which show by way of illustration embodiments of the invention. It is to be understood by those of ordinary skill in this technological field that other embodiments and examples may be utilized, and structural, electrical, as well as procedural changes may be made without departing from the scope of the present invention. Wherever possible, the same reference numbers will be used throughout the drawings to refer to the same or similar parts.

Figure 1:
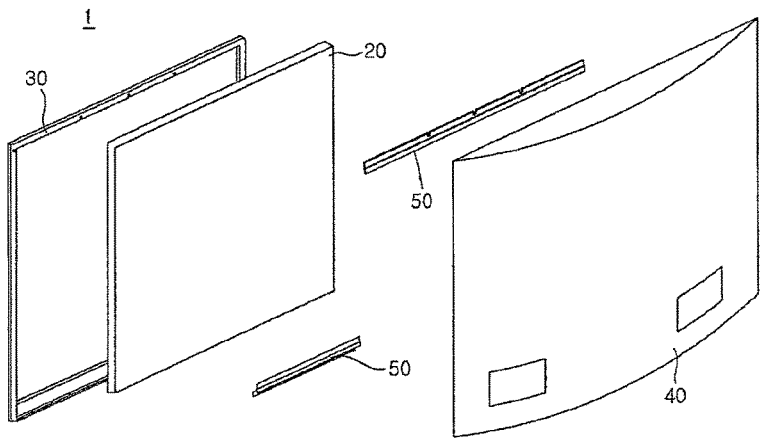
FIG. 1 is an exploded perspective view illustrating a configuration of a display apparatus according to an embodiment of the present invention.

FIG. 1 is an exploded perspective view illustrating a configuration of a display apparatus according to an embodiment of the invention. The display apparatus here is preferably an LCD type, but can be of another display type.

Referring to FIG. 1, the display apparatus 1 can include a display module 20, a front cover 30 and a back cover 40 covering the display module 20, a fixation member 50 for fixing the display module 20 to the front cover 30 and/or the back cover 40.

Meanwhile, the front cover 30 can include a front panel made of a transparent material, which transmits light. The front panel is disposed in the display module 20, more particularly, in the front of a display panel included in the display module 20 to protect the display module 20 from an external shock and to show a picture displayed in the display module 20 by transmitting the light emitted from the display module 20 to the outside.

One side of the fixation member 50 is fixed to the front cover 30 by a fastening member such as a screw, for example and the other side supports the display module 20 to the front cover 30 to fix the display module 20 to the front cover 30.

In the embodiment, the fixation member 50 has a plate shape that extends lengthily in one direction, for example, but the additional fixation member 50 may not be provided and the display module 20 can be configured to be fixed to the front cover 30 or the back cover 40 by the fastening member.

Figure 2:
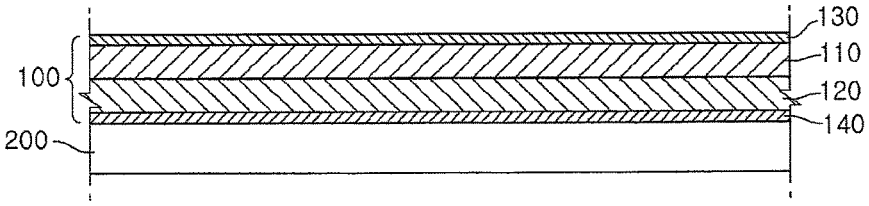
FIG. 2 is a cross-sectional view illustrating a schematic configuration of a display module according to an embodiment of the present invention.

FIG. 2 is a cross-sectional view illustrating a schematic configuration of a display apparatus according to an embodiment of the present invention. The display module 20 provided in the display apparatus of FIG. 1 can be configured to include a display panel 100 and a backlight unit 200 as shown in FIG. 2. Particularly, the display module 20 includes the backlight unit 200 preferably extending with the display panel 100 so that the backlight unit 200 is disposed below and corresponds to the image displaying region of the display panel 100. For example, the size of the backlight unit 200 may be the same as or similar to the size of the display panel 100. The display apparatus of FIG. 2 is preferably an LCD type, but may be of another display type.

Referring to FIG. 2, the display panel 100 for displaying images thereon includes a color filter substrate 110 and a thin film transistor (TFT) substrate 120 that are opposed to each other and attached to have a uniform cell gap. A liquid crystal layer can be interposed between the two substrates 110 and 120.

The color filter substrate 110 includes a color filter including red (R), green (G), and blue (B) color filter portions and can generate an image corresponding to a red, green, or blue color when the light is applied.

Meanwhile, the pixels can be composed of the red, green, and blue sub-pixels, but is not limited thereto like one example in which red, green, blue, and white (W) sub-pixels configure one pixel and the pixel can be configured by various combinations.

The TFT substrate 120 includes a plurality of TFTs arranged preferably in a matrix configuration, and each of the TFTs can selectively switch a pixel electrode as a switching device. For example, a common electrode and the pixel electrode can transform the array of molecules of the liquid crystal layer depending on a predetermined voltage applied from the outside.

The liquid crystal layer is composed of a plurality of liquid crystal molecules. The liquid crystal molecules change the array in accordance with a voltage difference generated between the pixel electrode and the common electrode. As a result, light provided from the backlight unit 200 can be inputted into the color filter substrate 110 in accordance with the change of the array of the molecules of the liquid crystal layer. Further, an upper polarizer 130 and a lower polarizer 140 can be disposed on the top and the bottom of the display panel 100, respectively, and more particularly, the upper polarizer 130 can be formed on the top of the color filter substrate 110 and the lower polarizer 140 can be formed on the bottom of the TFT substrate 120.

Meanwhile, a gate drive and a data driver that generate driving signals for driving the panel 100 can be provided on the side of the display panel 100.

The structure and configuration of the display panel 100 are just one example and modification, addition, and deletion the embodiment can be made within the scope without departing from the spirit of the present invention. That is, the display panel 100 can be any known display panel that can be used with the backlight unit 200.

As shown in FIG. 2, the display apparatus according to the embodiment of the present invention can be configured by closely disposing the backlight unit 200 to the back of the entire surface of the display panel 100.

For example, the backlight unit 200 can be bonded and fixed onto the bottom surface of the display panel 100, more particularly, the lower polarizer 140. For this, an adhesive layer can be interposed between the lower polarizer 140 and the backlight unit 200.

As described above, it is possible to reduce the entire thickness of the display apparatus by closely contacting the backlight unit 200 to the back surface of the display panel 100, thereby improving the exterior of the display apparatus and it is possible to simplify the structure and manufacturing process of the display apparatus by removing a structure for fixing the backlight unit 200.

Further, by removing a gap between the backlight unit 200 and the display panel 100, it is possible to prevent malfunction of the display apparatus or deterioration in an image quality of a display picture that is caused due to the insertion of foreign substances, etc. into the gap.

According to the embodiment of the present invention, the backlight unit 200 can be configured by laminating a plurality of function layers, and at least one layer of the plurality of function layers can be provided with a plurality of light sources.

Further, as described above, it is preferable that the backlight unit 200, more particularly, a plurality of layers configuring the backlight unit 200 are made of flexible materials, respectively, so as to closely fix the backlight unit 200 onto the bottom surface of the display panel 100.

In addition, a bottom cover on which the backlight unit 200 is seated can be provided on the bottom of the backlight unit 200.

According to the embodiment of the present invention, the display panel 100 can be divided into a plurality of regions. The brightness of light emitted from a corresponding region of the backlight unit 200, that is, the brightness of the corresponding light source is adjusted in accordance with a gray peak value or a color coordinate signal of each of the divided regions, such that the luminance of the display panel 100 can be adjusted.

For this, the backlight unit 200 can operate by being divided into a plurality of division driving regions corresponding to the divided regions of the display panel 100, respectively.

Figure 3:
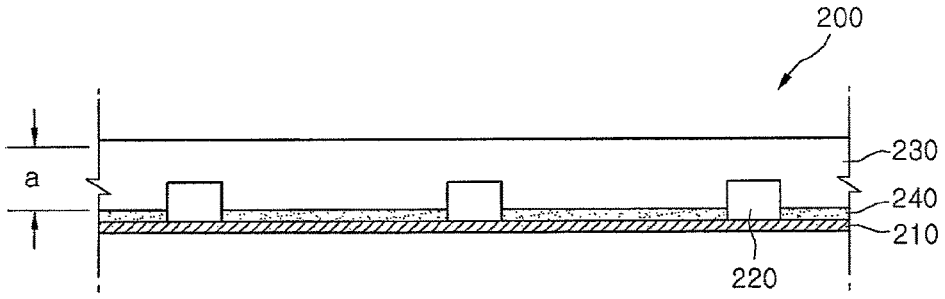
FIGS. 3 and 4 are cross-sectional views illustrating configurations of a backlight unit according to a first embodiment of the present invention.

FIG. 3 is a cross-sectional view illustrating a configuration of a backlight unit according to a first embodiment of the present invention. The illustrated backlight unit 200 can include a first layer 210, light sources 220, a second layer 230, and a reflection layer 240. The light sources 220 in the backlight unit 200 are formed below the display panel 100 for providing light throughout the display panel 100 as shown in FIGS. 1 and 2.

Referring to FIG. 3, the plurality of light sources 220 are formed on the first layer 210 and the second layer 230 is disposed on the top of the first layer 210 to cover the plurality of light sources 220. Preferably the second layer 230 completely encapsulates the light sources 220 formed on the first layer 210, but in another example, thes second layer 230 can cover only certain portions/sides of the light sources 220 formed on the first layer 210.

The first layer 210 may be a substrate on which the plurality of light sources 220 are mounted. An electrode pattern for connecting the light source 220 with an adapter for supplying power may be formed on the first layer 210. For example, a carbon nanotube electrode pattern for connecting the adapter with the light source 220 can be formed on the top of the substrate.

Meanwhile, the first layer 210 is formed by using polyethyleneterephthalate, glass, polycarbonate, silicon, etc. and may be a printed circuit board (PCB) substrate on which the plurality of light sources 220 are mounted and may have a film shape.

Each light source 220 may be a light emitting diode (LED) chip or one of light emitting diode packages with at least one light emitting diode chip. In the embodiment, one example in which the light emitting diode package is provided as the light source 220 will be described.

Meanwhile, the LED packages configuring the light sources 220 can be classified into a top view scheme and a side view scheme in accordance with a direction in which a light emitting surface faces. Each light source 220 according to the embodiment of the present invention can be configured by using at least one of the top view-type LED package in which the light emitting surface of the LED package is the top surface of the LED package (e.g., the light is emitted upwardly or in a vertical direction) and the side view-type LED package in which the light emitting surface of the LED package is a side surface of the LED package (e.g., the light is emitted to the side of the LED package or in a horizontal direction).

Further, each light source 220 can be configured by a colored LED or a white LED emitting at least one color among colors such as red, blue, and green colors, etc. In addition, the colored LED can include at least one of a red LED, a blue LED, and a green LED. The disposition and emitting light of the light emitting diode can be changed within a technical scope of the embodiments.

Meanwhile, the second layer 230 formed to be disposed on the top of the first layer 210 to cover the plurality of light sources 220 can uniformly provide the light emitted from the light sources 220 to the display panel 100 by transmitting and diffusing the light emitted from the light sources 220.

The reflection layer 240 that reflects the light emitted from the light sources 220 can be formed between the first layer 210 and the second layer 230, e.g., on the top of the first layer 210 but below the second layer 230. The reflection layer 240 can more widely diffuse the light emitted from the light sources 220 by reflecting the light full-reflected from a boundary of the second layer 230 again.

The reflection layer 240 can use a sheet to which a white pigment such as titanium oxide is dispersed to a sheet made of a synthetic resin, a sheet laminated with a metal deposition film onto the surface thereof, a sheet in which a bubble is dispersed so as to diffuse the light to a sheet made of the synthetic resin, etc. The surface of the reflection layer 240 may be coated with silver (Ag) so as to increase the reflectance. Meanwhile, the reflection layer 240 may be coated on the top of the first layer 210 which is the substrate.

The second layer 230 can be formed with a light transmissive material, e.g., silicon or an acrylic resin. However, the second layer 230 is not limited to the above-mentioned material and can be formed with various resins in addition to the above-mentioned material.

Further, the second layer 230 can be made of a resin having a refractive index of approximately 1.4 to 1.6 so that the backlight unit 200 can have uniform luminance by diffusing the light emitted from the light sources 220.

For example, the second layer 230 can be made of any one material selected from a group consisting of polyethylene-terephthalate, polycarbonate, polypropylene, polyethylene, polystyrene and polyepoxy, silicon, acryl, etc.

The second layer 230 can include a polymer resin having predetermined adhesion so as to be tightly and closely adhere to the light sources 220 and the reflection layer 240. For example, the second layer 230 can be configured to include an acrylic resin such as unsaturated polyester, methylmethacrylate, ethylmethacrylate, isobutylmethacrylate, normal butylmethacrylate, normal butylmethylmethacrylate, acrylic acid, methacrylic acid, hydroxy ethylmethacrylate, droxy propylmethacrylate, hydroxy ethylacrylate, acrylamide, methylol acrylamide, glycidyl methacrylate, ethylacrylate, isobutylacriate, normal butylacrylate, 2-ethylhexyl acrylate polymer, or copolymer, or terpolymer, etc., an urethane resin, an epoxy resin, a melamine resin, etc.

The second layer 230 may be formed by applying and curing a liquid or gel-type resin onto the top of the first layer 210 where the plurality of light sources 220 and the reflection layer 240 are formed or the second layer 230 may be formed by adhering onto the top of the first layer 210 by being separately fabricated.

Meanwhile, as the thickness 'a' of the second layer 230 increases, the light emitted from the light sources 200 is more widely diffused, such that the light having uniform luminance can be provided to the display panel 100 from the backlight unit 200. In contrast, as the thickness 'a' of the second layer 230 increases, the quantity of light which is absorbed in the second layer 230 can increase. Therefore, the luminance of the light provided to the display panel 100 from the backlight unit 200 can uniformly decrease.

Accordingly, in order to provide the light having uniform luminance while not largely decreasing the luminance of the light provided to the display panel 100 from the backlight unit 200, it is preferable that the thickness 'a' of the second layer 230 is in the range of 0.1 to 4.5 mm or approximately 0.1 to 4.5 mm.

Figure 4:
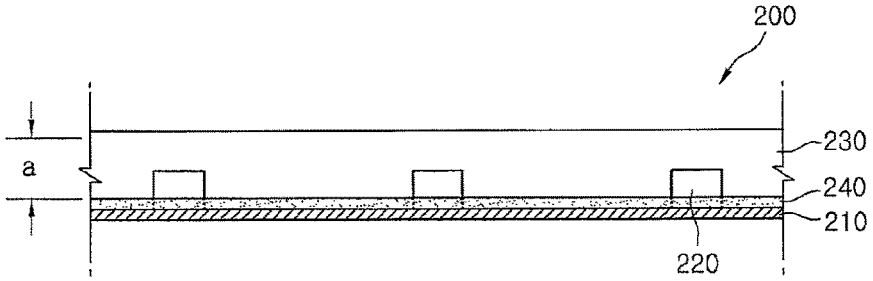

FIG. 4 is a cross-sectional view of a region of a backlight unit 200, where light sources 220 are not disposed (e.g., a region between the light sources 220). A description of the same components of the illustrated backlight unit 200 as those explained by referring to FIGS. 2 to 3 will now be omitted.

Figure 31:
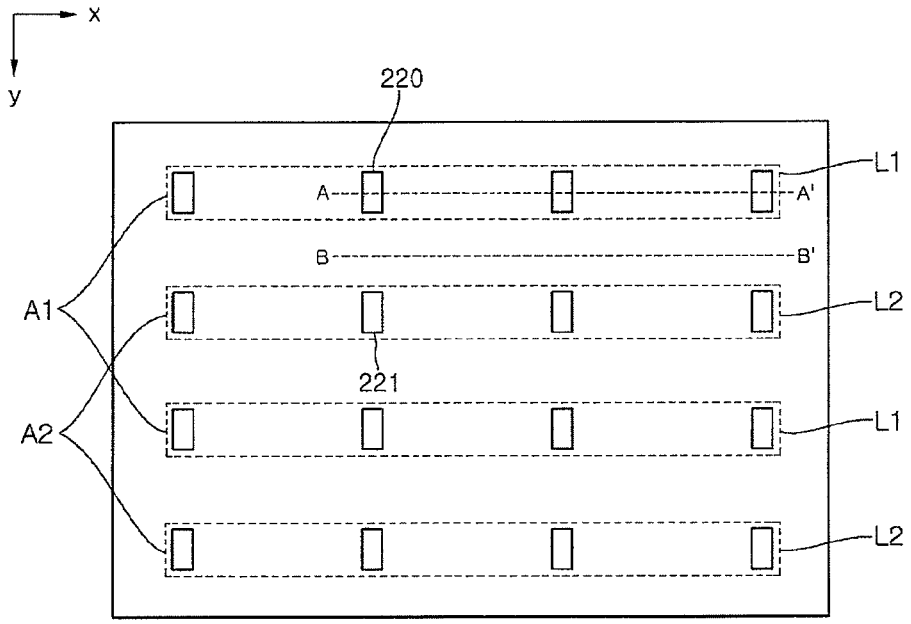
FIGS. 31 to 35 are plan views illustrating embodiments of a structure in which a plurality of light sources are disposed in a backlight unit according to the present invention.

By using the backlight unit 200 shown in FIG. 31 as an example, the cross-sectional view shown in FIG. 3 shows a cross-sectional configuration of a region where the light sources 220 are positioned in the backlight unit 200 taken along line A-A' and the cross-sectional view shown in FIG. 4 shows a cross-sectional configuration of a region where the light sources 200 are not positioned taken along line B-B'.

Referring to FIG. 4, the region where the light sources 220 are not positioned may have a structure in which the reflection layer 240 covers the top of the first layer 210. In this region, for example, the reflection layer 240 is formed on the first layer 210 without the holes into which the light sources 220 can be inserted. Instead, such holes are formed in regions of the reflection layer 240 corresponding to the positions of the light sources 220, and the light sources 220 are protruded upward through the holes of the reflection layer 240 to be covered by the second layer 230 as shown in FIG. 3.

Hereinafter, the configuration of the backlight unit 200 according to the embodiment(s) of the present invention will be described in detail by using a case in which the first layer 210 provided in the backlight unit 100 is a substrate where the plurality of light sources 200 are formed and the second layer 230 is a resin layer made of a predetermined resin as one example.

Figure 5:
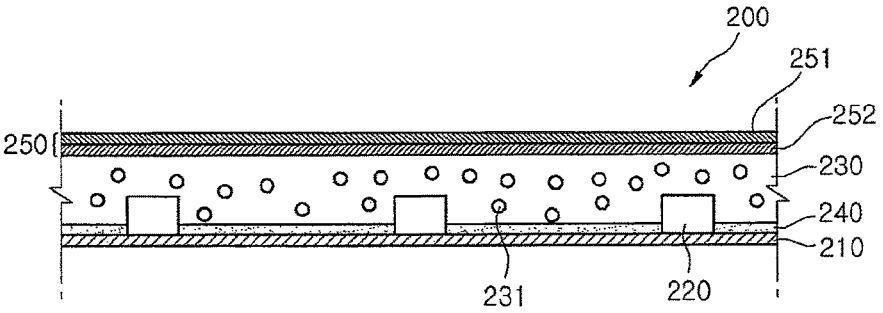
FIG. 5 is a cross-sectional view illustrating a configuration of a backlight unit according to a second embodiment of the present invention.

FIG. 5 is a cross-sectional view illustrating a configuration of a backlight unit according to a second embodiment of the present invention. Description of the same components of the backlight unit 200 shown in FIG. 5 as those explained by referring to FIGS. 2 and 3 will now be omitted.

Referring to FIG. 5, the plurality of light sources 220 can be mounted on the substrate 210 and the resin layer 230 can be disposed on the top of the substrate 210 to cover the light sources 230 entirely or partially. Meanwhile, the reflection layer 240 can be formed between the substrate 210 and the resin layer 230, e.g., on the top of the substrate 210.

Further, as shown in FIG. 5, the resin layer 230 can include a plurality of scattering particles 231 and the scattering particles 231 can more widely diffuse the light emitted from the light sources 220 by scattering or refracting the incident light.

The scattering particles 231 can be made of a material having a refractive index different from the material forming the resin layer 230, e.g., a material having a refractive index higher than that of the silicon-type or acrylic resin forming the resin layer 230 so as to scatter or refract the light emitted from the light sources 220.

For example, the scattering particles 231 can be configured by polymethylmethacrylate/styrene copolymer (MS), polymethylmethacrylate (PMMA), polystyrene (PS), silicon, titanium dioxide ($TiO_2$), silicon dioxide ($SiO_2$), etc. and can be configured by combining the materials.

Meanwhile, the scattering particles 231 can be configured even by a material having a refractive index lower than that of the material forming the resin layer 230 and for example, can be configured by forming the bubbles in the resin layer 230.

Further, the material for forming the scattering particle 231 is not limited to the above-mentioned materials and the scattering particle 231 can be configured by using various polymer materials or inorganic particles other than the above-mentioned materials.

According to the embodiment(s) of the present invention, the resin layer 230 can be formed by mixing the scattering particles 231 with the liquid-type or gel-type resin, and applying them onto the top of the first layer 210 where the plurality of light sources 220 and the reflection layer 240 are formed.

Referring to FIG. 5, an optical sheet 250 can be disposed on the top of the resin layer 230 and for example, the optical sheet 250 can include one or more prism sheets 251 and/or one or more diffusion sheets 252.

In this case, a plurality of sheets included in the optical sheet 250 are provided by being closely contacting each other without being separated from each other, such that it is possible to minimize or reduce the thickness of the optical sheet 250 or the backlight unit 200.

Meanwhile, the bottom of the optical sheet 250 can be closely contacted to the resin layer 230 and the top of the optical sheet 250 can be closely contacted onto the bottom of the display panel 100, e.g., on the lower polarizer 140.

The diffusion sheet 252 prevents light emitted from the resin layer 230 from being partially focused by diffusing the incident light to thereby making the luminance of the light more uniform. Further, the prism sheet 251 allows the light to be vertically inputted into the display panel 100 by focusing the light emitted from the diffusion sheet 252.

According to another embodiment of the present invention, the optical sheet 250, for example, at least one of the prism sheet 251 and the diffusion sheet 252 can be removed or the optical sheet 250 can be configured by including various function layers in addition to the prism sheet 251 and the diffusion sheet 252.

Further, a plurality of holes or indentations may be formed at positions of the reflection layers 240 corresponding to the plurality of light sources 220 so that the plurality of light sources 220 to be disposed on the lower substrate 210 may be inserted into the holes or indentations.

In this case, the light sources 220 are inserted in a lower part through the holes formed in the reflection layer 240 and at least some of the light sources 220 may protrude on the top of the reflection layer 240.

As such, it is possible to further improve the fixation force between the substrate 210 mounted with the light sources 220 and the reflection layer 240 by configuring the backlight unit 200 by using the structure in which the light sources 220 are inserted into the holes of the reflection layer 240.

Figure 6:
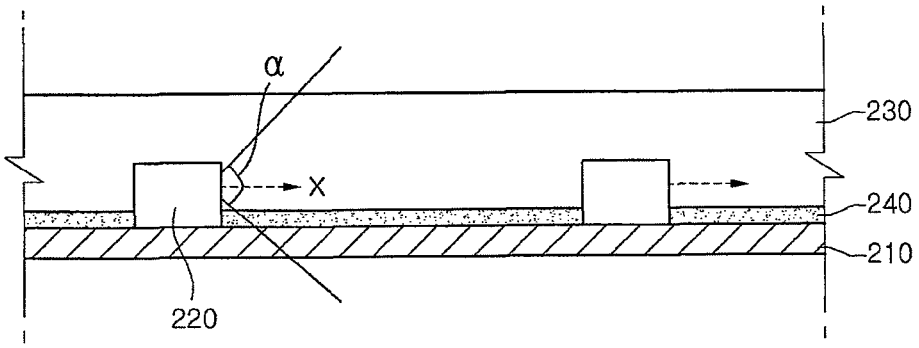
FIG. 6 is a cross-sectional view illustrating a configuration of a backlight unit according to a third embodiment of the present invention.

FIG. 6 is a cross-sectional view illustrating a configuration of a backlight unit according to a third embodiment of the present invention, and depicts an example of the light sources 220 inserted within the indentations/holes defined through the reflections layer 240. Description of the same components of the backlight unit 200 shown in FIG. 6 as those explained by referring to FIGS. 2 to 5 will now be omitted.

Referring to FIG. 6, each of the plurality of light sources 220 provided in the backlight unit 200 has the light emitting surface on the side surface thereof and can emit light in a lateral direction, e.g., a direction in which the substrate 210 or the reflection layer 240 extends above the substrate 210.

For example the plurality of light sources 220 can be configured by using the side view-type LED packages. As a result, it is possible to reduce a limitation that the light source 220 is observed as a hot spot on a screen, and it is possible to produce a slim backlight unit 200 and thus a slim display apparatus by reducing the thickness 'a' of the resin layer 230.

In this case, each light source 220 can emit light having an orientation angle $\alpha$ of, for example, 90 to 150 degrees centering on a first direction X (indicated by an arrow). Hereinafter, light emitted from the light source 220 is represented as being emitted in the first direction X (indicated by the arrow).

According to an embodiment of the present invention, a reflection pattern is formed on the top of the resin layer 230 to reflect and diffuse the light upwards from the light sources 220, thereby emitting the light having more uniform luminance from the backlight unit 200. These features are described in more detail referring to FIGS. 7 to 10.

FIGS. 7 to 12 are cross-sectional views illustrating configurations of a backlight unit of a display apparatus according to a fourth embodiment of the present invention. A description of the same components of the backlight unit 200 shown in FIGS. 7 to 12 as the components explained by referring to FIGS. 1 to 6 will now be omitted. Each of the light sources 220 in FIGS. 7 to 12 preferably emits light to the side from a side surface of the light source, e.g., as shown in FIG. 6, but as a variation, may emit light from the top surface of the light source.

Figure 7:
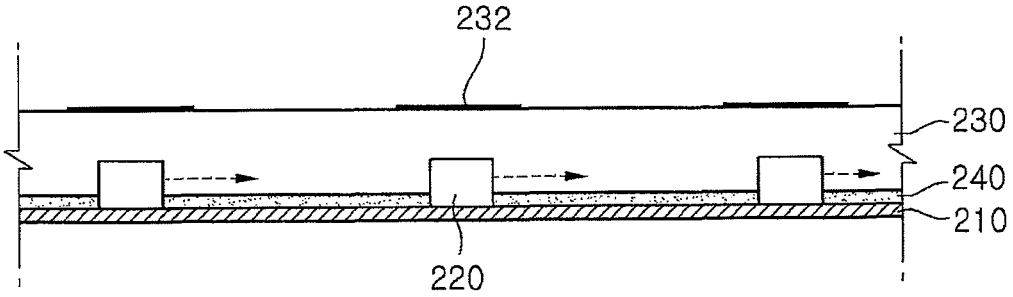
FIGS. 7 to 12 are cross-sectional views illustrating configurations of a backlight unit according to a fourth embodiment of the present invention.

Referring to FIG. 7, a pattern layer including a plurality of patterns 232 may be formed on the top of the resin layer 230 of the backlight unit 200 including the light sources 220. More specifically, the plurality of patterns 232 included in the pattern layer may be formed on the resin layer 230 to correspond respectively to the positions where each of the light sources 220 is disposed.

For example, the patterns 232 formed on the top of the resin layer 230 may be a reflection pattern that reflects at least a part of the light emitted from the light source 220. As shown in FIG. 7, it is possible to reduce the luminance of light emitted from an area adjacent to each light source 220 by forming the reflection patterns 232 on the resin layer 230, thereby causing the backlight unit 200 to emit light having a uniform luminance.

That is, each reflection pattern 232 is formed on the resin layer 230 to correspond to a position where each of the plurality of light sources 220 is formed to reduce or control selectively the luminance of the light emitted from the area directly above each light source 220 and the area adjacent to each light source 220 by selectively reflecting the light emitted from an area above the top surface of each light source. The reflected light may be diffused to a lateral direction.

More specifically, the light emitted upwardly from each light source 220 is reflected selectively downwards while being diffused in the lateral direction by the reflection pattern 232, and the light reflected by the reflection pattern 232 may be reflected upwards while being diffused in the lateral direction by the reflection layer 240 again. That is, the reflection patterns 232 may reflect 100% of the light impinging thereon, or may reflect a portion of the light impinging thereon while transmitting a portion of the same light. As such, the characteristics of the reflection patterns 232 can be modified to control the light propagation through the resin layer 230 and the patterns 232.

As a result, the light emitted from the light sources 220 can be widely diffused in the lateral direction and in other directions without concentrating on the upper direction so as to allow the backlight unit 200 to emit the light having a more uniform luminance.

The reflection patterns 232 include a reflection material such as metal, etc. For example, the reflection pattern 232 may include metal such as aluminum, silver, gold, or the like having a reflectance of 90% or more. For example, the reflection patterns 232 may be formed with a material such that about 10% or less of the total light impinging thereon would be transmitted therethrough while the remaining % (or less) of the total light would be reflected by the reflection patterns 232.

In this case, the reflection patterns 232 may be formed by depositing or coating the metal. As another method, the reflection patterns 232 may be formed by performing a printing operation using reflection ink including the metal, for example, silver ink in accordance with a predetermined pattern.

Further, in order to improve a reflective effect of the reflection pattern 232, a color of the reflection pattern 232 may have a color close to a color having a high brightness, for example, a white color. For example, the reflection pattern 232 may have a color having a higher brightness than that of the resin layer 230.

Meanwhile, the reflection patterns 232 may include metal oxide. For example, the reflection patterns 232 may include titanium dioxide ($TiO_2$). More specifically, the reflection patterns 232 may be formed by performing the printing operation using reflection ink including titanium dioxide ($TiO_2$).

FIGS. 8 through 12 illustrate other examples of forming a plurality of patterns 232 to correspond to the positions of light sources 220 according to the invention. A description of the same components of the backlight unit 200 shown in FIGS. 8 to 12 as the components explained by referring to FIGS. 1 to 7 will now be omitted.

Figure 8:
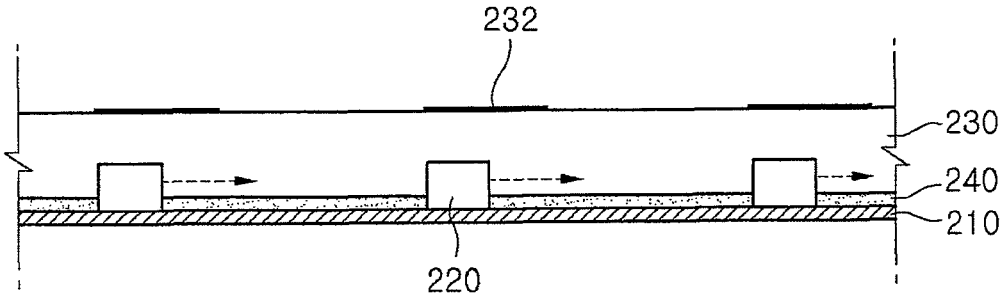
Figure 9:
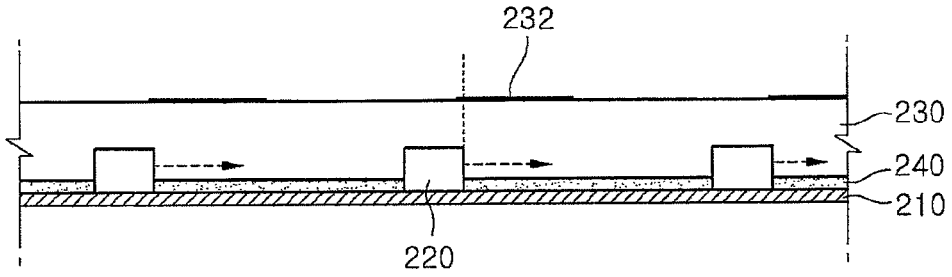
Figure 10:
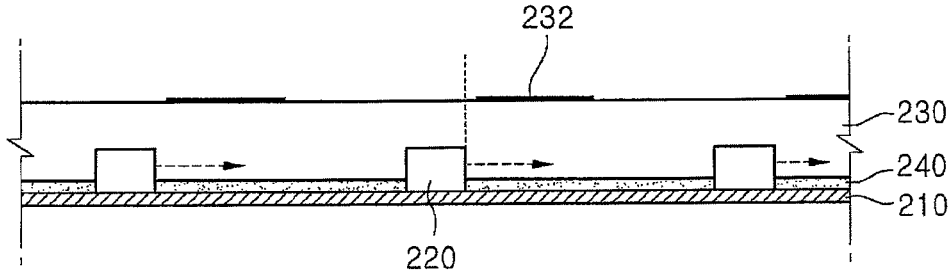

Referring to FIGS. 8 to 10, the case where the plurality of reflection patterns 232 are formed to correspond to the positions of the light sources 220 may include a case where the center of each reflection pattern 232 is formed to coincide with (or substantially coincide with) the center of the corresponding light source 220 (e.g., FIG. 7) and a case where the center of each reflection pattern 232 is spaced from the center of the corresponding light source 220 by a predetermined gap (e.g., FIG. 8, 9 or 10).

According to one example of the present invention, as shown in FIG. 8, the center of each reflection pattern 232 may not coincide with the center of the corresponding light source 220.

For example, when the light emitting surface of the light source 220 faces not the upper direction but the lateral direction and therefore, the light is emitted from the light source 220 in the lateral direction, then the luminance level of the light emitted from the side surface of each light source 220 may decrease as the light travels through the resin layer in a direction indicated by an arrow in FIG. 8. As a result, a first area immediately adjacent to the light emitting surface of the light source 220 may have a higher luminance than adjacent areas. Therefore, the reflection patterns 232 may be formed by extending off center from the corresponding light source 220 in the direction indicated by the arrow of light emitted from the light source 220.

For example, the center of the reflection pattern 232 may be formed at a position slightly deviated from the center of the corresponding light source 220 in the light emitting direction.

According to another example, referring to FIG. 9, the reflection pattern 232 may be formed at a position further moved in a light emission direction than the reflection pattern 232 shown in FIG. 8.

For example, the gap between the center of the reflection pattern 232 and the center of the light source 220 corresponding thereto may further increase than the gap shown in FIG. 8. For example, as shown in FIG. 9, the light emission surface of the light source 220 may be superimposed on a left end portion of the reflection pattern 232, or the end of the reflection pattern 232 may correspond to the light emission surface of the light source 220.

In another example, referring to FIG. 10, the reflection pattern 232 may be formed at a position further moved in the light emission direction (indicated by an arrow) than the reflection pattern 232 shown in FIG. 9.

For example, as shown in FIG. 10, the region where the reflection pattern 232 is formed may not be superimposed on the region where the corresponding light source 220. Therefore, the left end portion of the reflection pattern 232 may be spaced from the light emission surface of the light source 220 by a predetermined gap.

Figure 11:
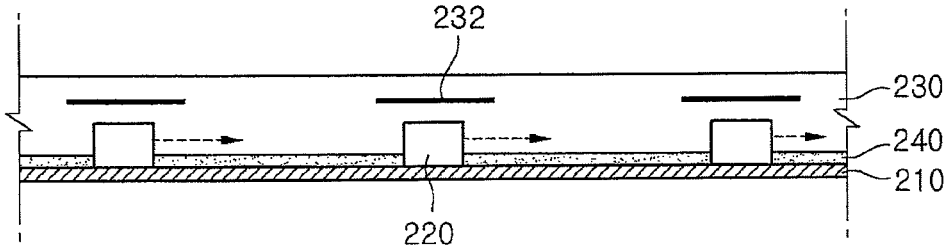

According to yet another embodiment of the present invention, as shown in FIG. 11, the reflection patterns 232 may be formed within the resin layer 230. In another variation, the reflections patterns 232 which are off centered from the light sources 220 (e.g., as shown in FIGS. 8 to 10) may formed within the resin layer 230.

Figure 12:
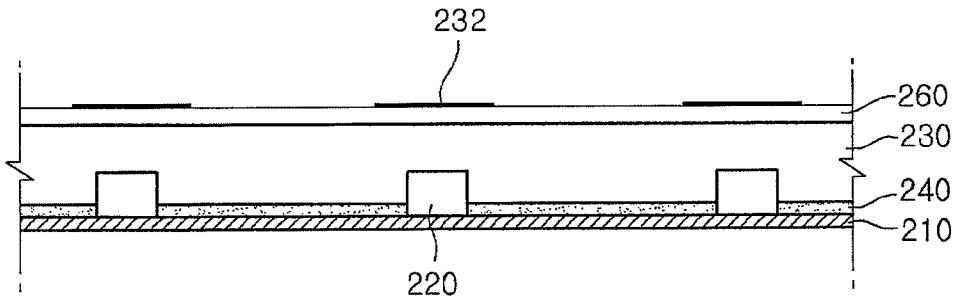

Referring to FIG. 12, the reflection patterns 232 may be manufactured in a sheet form. In this case, the pattern layer including the plurality of reflection patterns 232 may be formed on the resin layer 230.

For example, after the pattern layer is configured by forming the plurality of reflection patterns 232 on one surface of a transparent film 260 through printing, etc., the pattern layer including the transparent film 260 may be formed on the resin layer 230. More specifically, the reflection patterns 232 may be formed by printing the transparent film with a plurality of dots.

Meanwhile, as a ratio of an area where the reflection pattern 232 is formed in or on the resin layer 230 increases, an opening ratio decreases, such that the overall luminance of light provided from the backlight unit 200 to the display panel 100 may decrease. The opening ratio here indicates an amount of area where portions of the reflection pattern 232 is not formed within the reflection pattern 232, and through this area, the light may be transmitted. Therefore, in order to prevent the image quality of the pictures displayed by the display panel 100 from being deteriorated due to a rapid decrease in the luminance of the light provided to the display panel 100, the opening ratio of the pattern layer on which the reflection pattern 232 is formed is preferably at 70% or more. That is, the area where the reflection pattern is formed in the resin layer 230 preferably occupies 30% or less of the entire area.

Figure 13:
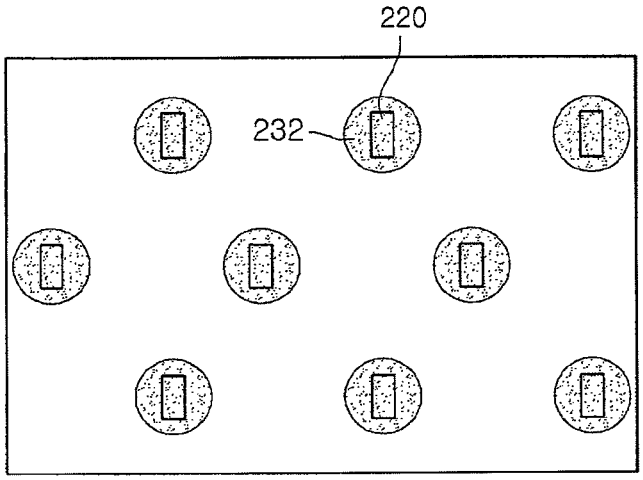
FIGS. 13 to 16 are plan views illustrating embodiments of placement of a pattern formed in a backlight unit according to the present invention.

FIG. 13 to are plan views illustrating various examples of placement of a pattern formed in a backlight unit for a display apparatus according to an embodiment of the invention. As described above, each reflection pattern 232 may be formed for the corresponding light source 220. Here, the reflection pattern 232 may be formed in or on the corresponding light source 220, e.g., as shown in FIGS. 7 to 12.

For example, as shown in FIG. 13, each reflection pattern 232 may have a circular shape or an oval shape centering on (or off-centered from) the position where the corresponding light source 220 is formed. However, each reflection pattern 232 can have a different shape and/or size.

Figure 14:
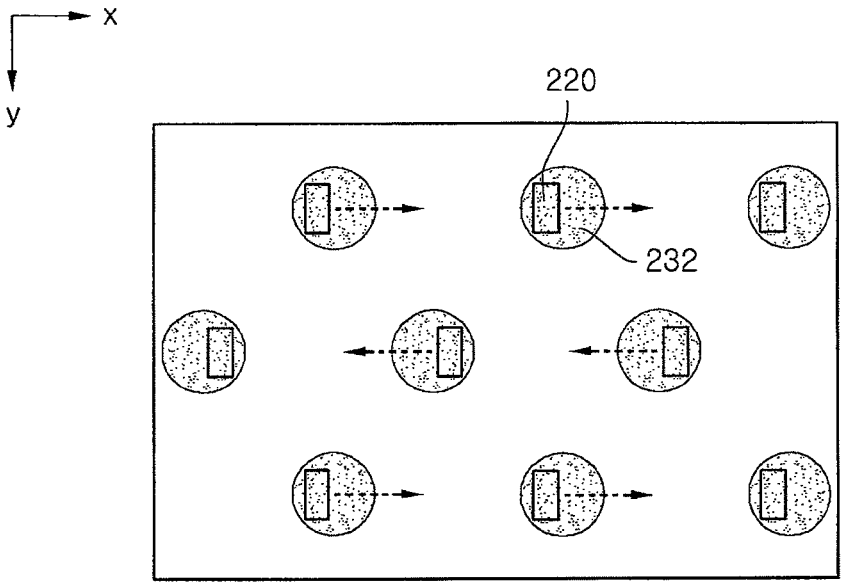

In another example, referring to FIG. 14, the reflection pattern 232 may be positioned by being moved from the center position of FIG. 13 to the left or right (depending on the location of the corresponding light source 220) in or towards the light emission direction (indicated by the arrows), that is, along an x-axis direction. Therefore, the center of the reflection pattern 232 may be spaced from the position where the center of the light source 220 corresponding thereto is formed in the light emission direction by a predetermined gap.

Figure 15:
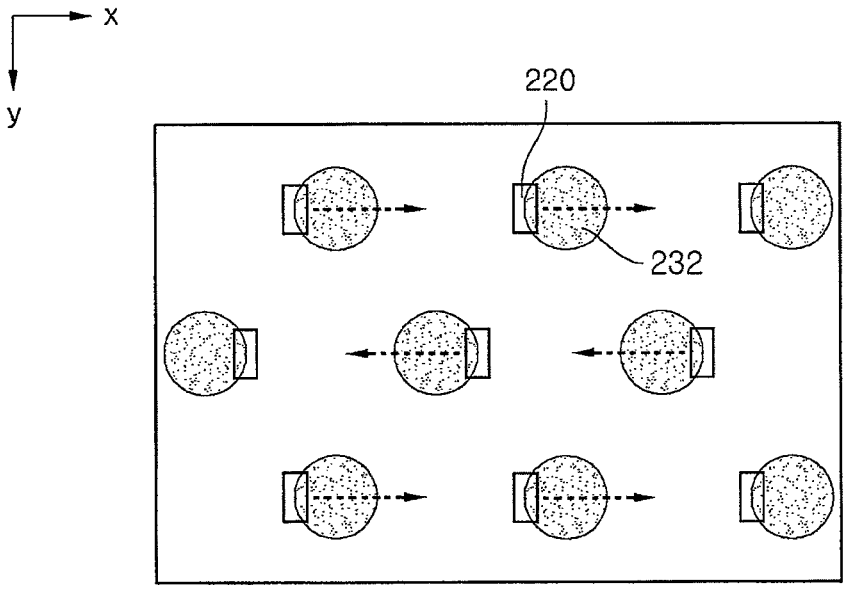

In still another example, referring to FIG. 15, the reflection pattern 232 may be positioned by further being moved in the light emission direction than the reflection pattern 232 shown in FIG. 14. Therefore, only a partial region of the region where the light source 220 is formed may be superimposed on the region where the reflection pattern 232 is formed.

Figure 16:
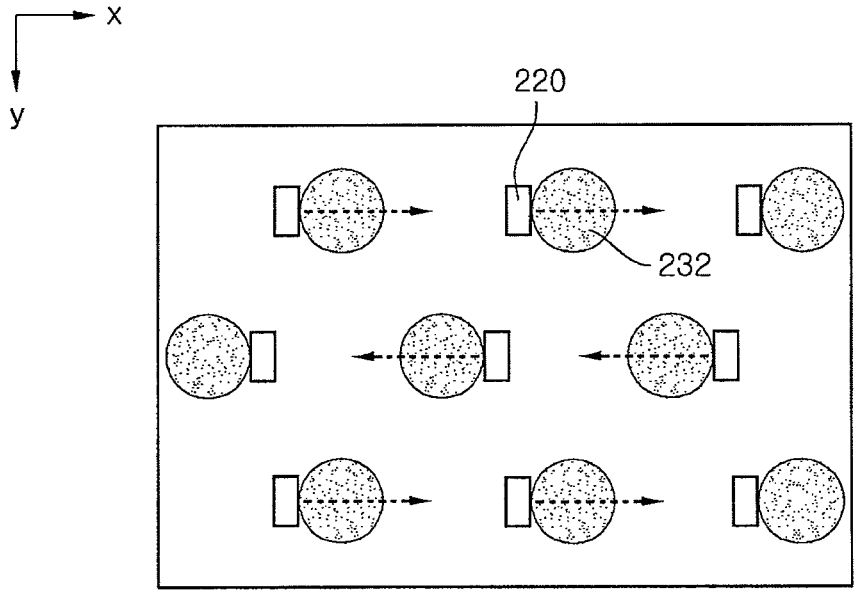

In still another example, referring to FIG. 16, the reflection pattern 232 may be positioned outside of the region where the light source 220 is formed by further being moved in the light emission direction than the reflection pattern 232 shown in FIG. 15. Therefore, the region where the light source 220 is formed may not be superimposed (or overlap) on the region where the reflection pattern 232 is formed.

FIGS. 17A to 17D are top plan views of a reflection pattern 232 for illustrating different examples of the shape of one reflection pattern 232 corresponding preferably to a light source 220 according to the invention. Each reflection pattern 232 of FIGS. 17A-17D can be used as the reflection pattern 232 of FIGS. 7 to 16. For example, each reflection pattern 232 may be composed of a plurality of dots or portions, each dot or portion including a reflection material, for example, metal or metal oxide.

Figure 17A:
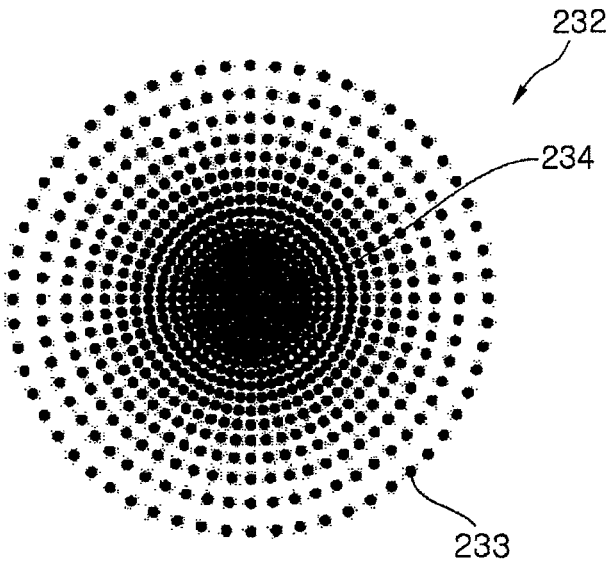
FIGS. 17A to 17D are diagrams illustrating embodiments of a shape of a pattern in a backlight unit according to the present invention.

Referring to FIG. 17A, in this example, each reflection pattern 232 may have a circle or cylinder shape (or other shape, e.g., diamond shape, etc.) centering on (or off-centered from) the area where the light source 220 is formed and the reflectance of the reflection pattern 232 may decrease outwards from a center 234 of the reflection pattern 232. The reflectance of the reflection pattern 232 may decrease gradually from the center 234 to its outer areas by having a less number of dots as one moves from the center 234 to the outer areas as shown and/or by decreasing the reflectance characteristics of the material in the pattern 232 as one moves from the center 234 to the outer areas. Further, the light transmittance or opening ratio of the reflection pattern 232 may increase outwards from the center 234 to the outer areas.

As a result, the position where the light source 220 is formed, more specifically, the center 234 of the reflection pattern 232 corresponding to the center of the light source 220 may have the highest reflectance (e.g., no or little light is transmitted therethrough), and the lowest transmittance or opening ratio. Therefore, it is possible to more effectively prevent the hot spot from being generated due to the concentration of light on the area where the light source 220 is formed.

In one example, in order to prevent the hot spot from being generated, according to an embodiment of the invention, an opening ratio of each reflection pattern 232 which is formed above the light source 220 may be preferably 5% or less.

If the plurality of dots 233 constituting the reflection pattern 232 are provided, gaps between adjacent dots 233 may increase outwards from the center 234 to the outer areas and as a result, the transmittance or the opening ratio of the reflection pattern 232 increases while the reflectance of the same reflection pattern 232 decreases outwardly from the center 234 of the reflection pattern 232 to its outer areas as described above.

Figure 17B:
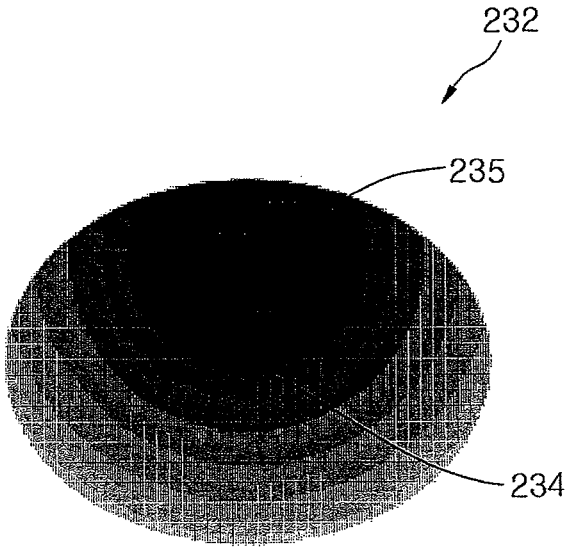

In another example, referring to FIG. 17B, each reflection pattern 232 may have an oval shape. The center 234 of this reflection pattern 232 may coincide with the center of the corresponding light source 220. As a variation, however, as shown in FIG. 17B, the center 234 of the reflection pattern 232 may not coincide with the center of the light source 220, and the center 234 may be off-centered from the center of the light source 220.

That is, as described by referring to FIGS. 8 to 10, the center 234 of the reflection pattern 232 may be formed at a position slightly deviated from the center of the corresponding light source 220 in one direction, for example, the direction of the light being emitted from the light source 220. For example, the portion 235 may coincide with the center of the corresponding light source 220. In this case, the reflectance of the reflection pattern 232 may decrease or the transmittance thereof may increase outwardly from a portion 235 of the reflection pattern 232 corresponding to the center of the light source 220.

In FIG. 17B, the portion 235 of the reflection pattern 232 corresponding to the center of the light source 220 may be positioned deviated from the center 234. The portion 235 of the reflection 234 corresponding to the center of the light source 220 may have the highest reflectance or the lowest transmittance.

Figure 17C:
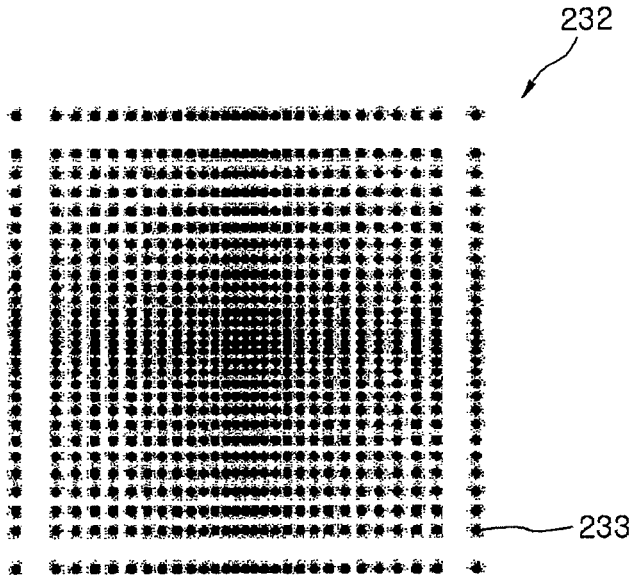
Figure 17D:
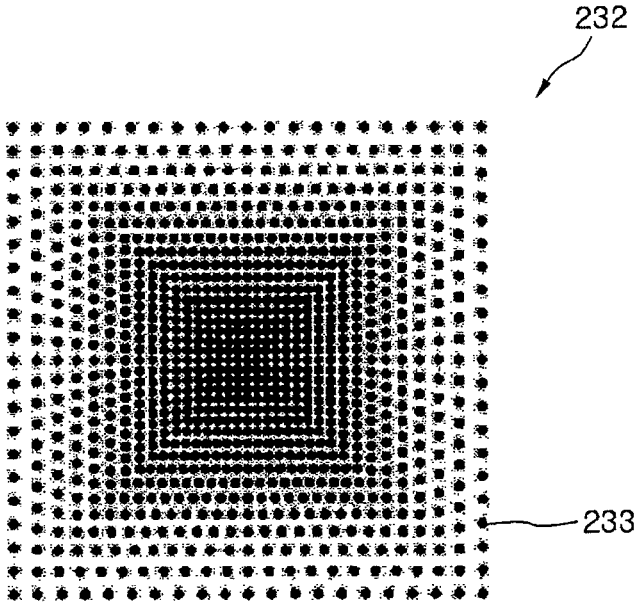

Referring to FIGS. 17C and 17D, each reflection pattern 232 may have a rectangle, a square, or a diamond shape centering on the area where the corresponding light source 220 is formed, and may have a reflectance that decreases as one moves from the center of the reflection pattern 232 to its outer areas, and an opening ratio that increases outwardly from the center thereof to its outer areas. Features pertaining to the reflection pattern 232 of FIGS. 17A and 17B can be equally applicable to the reflection pattern 232 of FIGS. 17C and 17D.

Even in this case, in order to prevent the hot spot from being generated, a central area of the reflection pattern 232 which superimposes or disposed over the corresponding light source 220 preferably has an opening ratio of 5% or less.

Meanwhile, as shown in FIGS. 17C and 17D, in case of the plurality of dots 233 constituting the reflection pattern 232, the size of each gap between adjacent dots 233 may increase outwardly from the center of the reflection pattern 232 to its outer areas.

As shown in FIGS. 17A to 17D, when the reflection pattern 232 according to the present invention is used, the hot spot phenomenon in which the light density concentrates on the area adjacent to the light source 220 is reduced significantly. For example, the light intensity is distributed out more throughout the light source area and adjacent areas.

In the above description, although the cases in which the reflection pattern 232 includes the plurality of dots by referring to FIGS. 17A to 17D are discussed, the present invention is not limited thereto and the reflection pattern 232 may have various structures in which the reflectance of the reflection pattern 232 decreases and the transmittance or the opening ratio of the reflection pattern 232 increases outwardly from the center thereof to its outer areas.

For example, the concentration of the reflection material, for example, the metal or metal oxide in the reflection pattern 232 may decrease outwards from the center of the reflection pattern 232 to its outer areas. As a result, by using the backlight unit of the present invention, it is possible to prevent the light density from concentrating on the area adjacent to the light source due to the decrease of the reflectance and the increase of the transmittance or the opening ratio.

Figure 18:
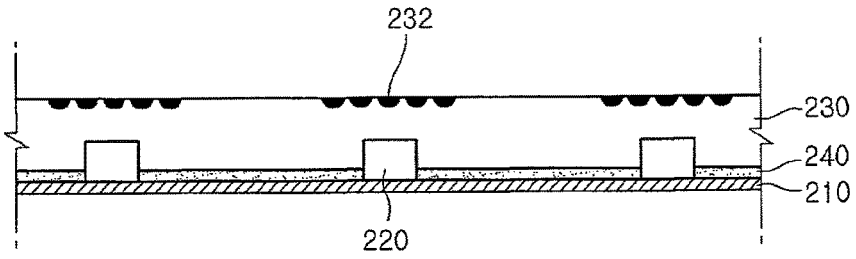
FIGS. 18 and 19 are cross-sectional views illustrating a configuration of a backlight unit according to a fifth embodiment of the present invention.
Figure 19:
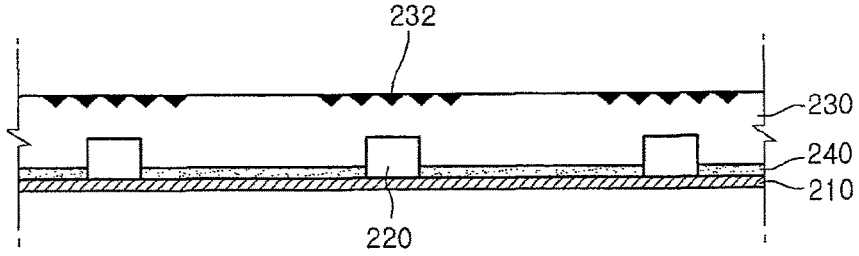

FIGS. 18 and 19 are cross-sectional views illustrating a configuration of a backlight unit for a display apparatus according to a fifth embodiment of the present invention. The backlight unit of FIGS. 18 and 19 may have the same components as the components of the backlight unit of FIGS. 1-17D, which may have been, but not necessarily, referenced by using certain same reference numerals. A description of the same components of the backlight unit 200 shown in FIGS. 18 to 19 as the components explained by referring to FIGS. 1 to 17D will now be omitted.

Referring to FIG. 18, each reflection pattern 232 of the backlight unit in this example may have a convex shape toward the corresponding light source 220. For example, the reflection pattern 232 may have a shape similar to a semicircle.

For example, a cross-sectional shape of the reflection pattern 232 may have a semicircle shape or an oval shape convexed toward the light source 220 as shown in FIG. 18.

The reflection pattern having the convex shape can reflect an incident light at various angles. Therefore, by using the reflection pattern 232, it is possible to make the luminance of light to be emitted upwards from the resin layer 230 more uniformly by diffusing the light emitted from the light source 220 more widely.

The reflection pattern 232 may include the reflection material such as metal, metal oxide, or the like as described above. For example, the reflection pattern 232 may be formed by forming a pattern on the top of the resin layer 230 by an intaglio method and filling the intaglio pattern with reflection material.

Alternatively, by printing a film-shaped sheet with the reflection material or attaching beads or metallic particles to the film-shaped sheet and thereafter, pressing the film onto the resin layer 230, the reflection pattern 232 shown in FIG. 18 may be formed on the top of the resin layer 230.

Meanwhile, a cross-sectional shape of the reflection pattern 232 may have various shapes convexed toward the light source 220 in addition to a shape similar to the semicircle shape shown in FIG. 18.

For example, as shown in FIG. 19, the cross-sectional shape of the reflection pattern 232 may have a triangle shape convexed toward the light source 220. In this case, the reflection pattern 232 may have a pyramid shape or a prism shape.

Further, as shown in FIG. 18 or 19, the reflection pattern 232 having the shape convexed toward the light source 220 may be disposed to have the top plane view in the pattern shown in FIGS. 12A to 14.

That is, the reflection pattern 232 may be disposed to have the circular shape or rectangular shape centering on (or off-centered from) the position where the corresponding light source 220 is formed in the backlight unit. The reflection pattern 232 may be disposed to have the reflectance decreased and the transmittance or the opening ratio increased outwards from the center thereof to its outer areas.

For example, in case that the plurality of reflection patterns 232 having the shape convexed toward the corresponding light source 220 shown in FIG. 18 or 19 are used, a gap between adjacent convexed portions of each reflection pattern 232 may increase outwardly from the center of the reflection pattern 232 to its outer areas, thereby preventing the hot spot from being generated due to the concentration of light on the area adjacent to the light source 220.

Further, although the center of the reflection pattern 232 coincides with (or substantially coincides with) the center of the light source 220 in FIGS. 18 and 19, the center of the reflection pattern 232 may be spaced from the center of the light source 220 in the light emission direction by a predetermined gap as described by referring to FIGS. 8 to 10.

Figure 20A:
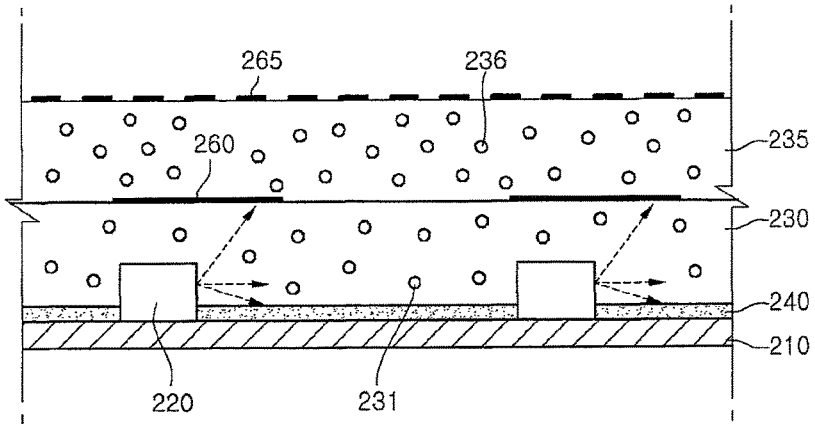
FIGS. 20A and 20B are cross-sectional views illustrating two examples of a configuration of a backlight unit according to a sixth embodiment of the present invention.
Figure 20B:
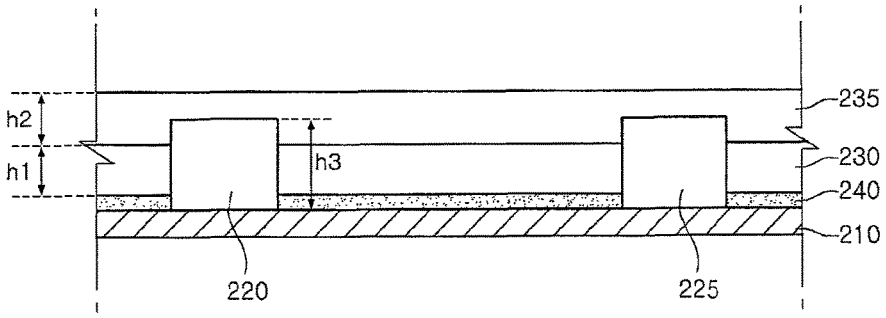

FIGS. 20A and 20B are cross-sectional views illustrating two different examples of a configuration of a backlight unit for a display apparatus according to a sixth embodiment of the present invention. The illustrated backlight unit 200 of FIGS. 20A and 20B can be configured to include a plurality of resin layers 230 and 235.

Referring to FIG. 20A, light emitted laterally from the light source 220 may be emitted upwards by being diffused by the resin layer 230. Further, the resin layer 230 includes the plurality of scattering particles 231 explained by referring to FIG. 4 to scatter or refract the light upwardly, thereby making the luminance of the light to travel upwards more uniformly.

According to the embodiment of the present invention, a second resin layer 235 may be disposed on the top of the (first) resin layer 230. The second resin layer 235 can be made of a material similar to or different from the first resin layer 230 and can improve the uniformity of the luminance of the light of the backlight unit 200 by diffusing the light emitted upward from the first resin layer 230.

The second resin layer 235 can be made of a material having the same refractive index as the material configuring the first resin layer 230 or of a material having a refractive index different therefrom.

For example, when the second resin layer 235 is made of a material having a refractive index higher than that of the first resin layer 230, the second resin layer 235 can more widely diffuse the light emitted from the first resin layer 230.

In contrast, when the second resin layer 235 is made of a material having a refractive index lower than that of the first resin layer 230, it is possible to improve reflectivity in which the light emitted from the first resin layer 230 is reflected on the bottom of the second resin layer 235, thereby allowing the light emitted from the light source 220 to easily advance along the first resin layer 230.

Meanwhile, the second resin layer 235 may also include a plurality of scattering particles 236. In this case, the density of the scattering particles 236 included in the second layer 235 may be higher than the density of scattering particles 231 included in the first resin layer 230.

As described above, it is possible to more widely diffuse the light emitted upward from the first resin layer 230 by including the scattering particles 236 in the second resin layer 235 with a higher density, thereby making the luminance of the light emitted from the backlight unit 200 more uniformly.

According to the embodiments of the present invention, the reflection pattern 232 explained by referring to FIGS. 7 to 19 above may be formed between the first resin layer 230 and the second resin layer 235, and or within at least one of the first and second resin layers 230 and 235.

Further, as shown in FIG. 20A, another pattern layer (e.g., pattern 265) may be formed on the top of the second resin layer 235 and the pattern layer formed on the second resin layer 235 may also include a plurality of patterns.

The pattern 265 on the top of the second resin layer 235 may be a reflection pattern that reflects at least part of the light emitted from the first resin layer 230. Therefore, it is possible to make the luminance of light emitted from the second resin layer 235 more uniformly.

For example, when the light traveling upwardly through the second resin layer 235 is focused on a predetermined part on top of the second resin layer 235 and is thus observed on the screen with a high luminance, the pattern 265 may be formed in one or more regions corresponding to the predetermined part(s) of the top of the second resin layer 235. Therefore, according to the invention, it is possible to make the luminance of the light emitted from the backlight unit 200 uniformly by reducing and evenly distributing the luminance of the light in the predetermined part.

The pattern 265 may be made of titanium dioxide ($TiO_2$). In this case, a part of the light emitted from the second resin layer 235 may be reflected downwardly and the rest part of the light emitted from the second resin layer 235 can be transmitted in the pattern 265. The pattern 265 can be a light shielding layer/pattern, or another reflection pattern 232.

In another example, referring to FIG. 20B, the height of the light sources 220, 225 may be greater than the thickness of the first resin layer 230. For instance, a thickness 'h1' of the first resin layer 230 is smaller than a height 'h3' of the light sources 220, 225. As a result, the first resin layer 230 may cover a lower part of the light sources 220, 225 and the second resin layer 235 may cover an upper part of the light sources 220, 225.

The first resin layer 230 may be composed of a resin having high adhesive strength. For example, the adhesive strength of the first resin layer 230 may be higher than that of the second resin layer 235. As a result, a light emitting surface of the light sources 220, 225 may adhere to the first resin layer 230 more strongly, and a space between the light emitting surface of the light source 220 (or 225) and the first resin layer 230 may not exist or may be minimized.

In one example, the first resin layer 230 may be composed of a silicon resin (or the like) having high adhesive strength, and the second resin layer 235 may be composed of an acrylic resin or the like.

Further, a refractive index of the first resin layer 230 may be higher than that of the second resin layer 235. And, the refractive index of the first resin layer 230 and the refractive index of the second resin layer 235 may be within 1.4 to 1.6.

Also, a thickness 'h2' of the second resin layer 235 is preferably smaller than the height 'h3' of the light sources 220, 225. Further, the features in the example of FIG. 20A can be provided to the backlight unit of FIG. 20B. For instance, the particles 231 and/or 236 can be provided in the first and/or second resin layer 230, 235, the pattern 265 can be provided on the second resin layer 235, etc.

Figure 21:
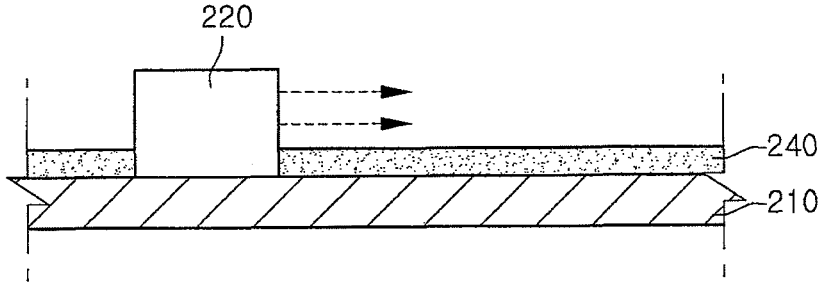
FIGS. 21 and 22 are cross-sectional views for explaining a positional relationship between a light source and a reflection layer that are provided in a backlight unit according to an embodiment of the present invention.
Figure 22:
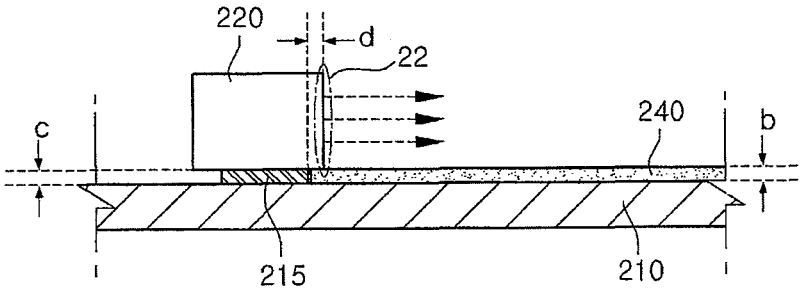

FIGS. 21 and 22 are diagrams for explaining a positional relationship of a light source 220 and a reflection layer 240 that are provided in a backlight unit 200 for a display apparatus according to the present invention. A description of the same components of the illustrated backlight unit 200 of FIGS. 21 and 22 as those explained by referring to FIGS. 2 to 20B will now be omitted.

Referring to FIG. 21, as the reflection layer 240 is disposed on the side of the light source 220, a part of light emitted to the side from the light source 220 is inputted into the reflection layer 240 to be lost.

The loss of the light emitted from the light source 220 decreases the amount of the light that advances by being inputted into the resin layer 230. As a result, the amount of light provided from the backlight unit 200 to the display panel 100 is decreased, such that the luminance of the display picture can be decreased.

According to the embodiment of the present invention, as shown in FIG. 22, it is preferable that the light source 220 is positioned above the reflection layer 240. As a result, the light emitted from the light source 220 advances along the resin layer 230 and can be emitted upward without being lost by the reflection layer 240.

That is, it is possible to improve the optical efficiency of the backlight unit 200 by positioning the light emission surface of the light source 220 above the reflection layer 240.

For example, a support member 215 can be formed between the light source 220 and the substrate 210 and the light source 220 can be supported and fixed onto the substrate 210 by the support member 215.

The support member 215 may be made of the same material as any one of the substrate 210, the light source 220, and the reflection layer 240. For example, the support member 215 may be formed by extending the substrate 210 or by extending a body part of the light source 220 or by extending the reflection layer 240.

The support member 215 can be configured by metal having electric conductivity and for example, can be configured by a metallic material including plumbum (Pb). More specifically, the support member 215 can be a solder pad for soldering the light source 220 onto the substrate 210.

The thickness (b) of the reflection layer 240 can be equal to or smaller than the thickness (c) of the support member 215. Therefore, the light source 220 can be positioned above the reflection layer 240.

Meanwhile, as the thickness (c) of the support member 215, i.e., the solder pad increases, resistance increases, such that since power supplied to the light source 220 can be lost, the thickness (c) of the support member 215 is preferably equal to or less than 0.14 mm. Therefore, the thickness (b) of the reflection layer 240 can also be equal to or less than 0.14 mm which is the maximum value of the thickness (c) of the support member 215.

Further, as the thickness of (b) of the reflection layer 240 decreases, the light reflectance of the reflection layer 240 can decrease, that is, a part of the light inputted from the light source 220 may be transmitted downward without being reflected at a predetermined thickness or less.

Therefore, the reflection layer 240 is positioned above the light source 220, such that the thickness (b) of the reflection layer 240 can be formed with 0.03 to 0.14 mm in order to reflect most of the light inputted from the light source 220 while improving the incident efficiency of the light.

Further, as shown in FIG. 22, a part of the reflection layer 240 can be inserted below the light source 220, more specifically, between the light source 220 and the substrate 210, thereby more certainly prevent the light emitted from the light source 220 from being lost by the reflection layer 240. For this, the support member 215 can be inserted from the end of the light source 220 by a predetermined distance (d).

Meanwhile, as the insertion distance (d) of the support member 215 decreases, the size of a part of the reflection layer 240 inserted into the bottom of the light source decreases to cause the stability of a structure in which the reflection layer 240 is inserted from deteriorating. Further, as the insertion distance (d) of the support member 215 increases, the light source 220 may unstably be support to the support member 215.

Accordingly, in order to improve the stability of the insertion structure of the reflection layer 240 and the support structure of the light source 220, the insertion distance (d) of the support member 215 is preferably in the range of 0.05 to 0.2 mm.

According to yet another embodiment of the present invention, the light source 220 can include a head part 22 emitting light in a lateral direction and a body part having an attaching surface for allowing the light source 220 to be mounted on the substrate 210, etc. Further, the head part 22 of the light source 220 can include a light emitting surface which actually emits light and a non-emitting surface that does not emit light on the outer periphery of the light emitting surface.

In this case, the light emitting surface of the head part of the light source 220 is preferable positioned above the reflection layer 240. Therefore, it is possible to improve the incident efficiency of the light by disabling the light emitted from the light source 220 to be lost by the reflection layer 240.

According to the embodiments of the invention, the head part 22 and/or the support member 215 discussed above in connection with FIG. 22 can be provided in any light source 220 and/or backlight unit 200 according to various examples and embodiments of the invention discussed above and below.

Figure 23:
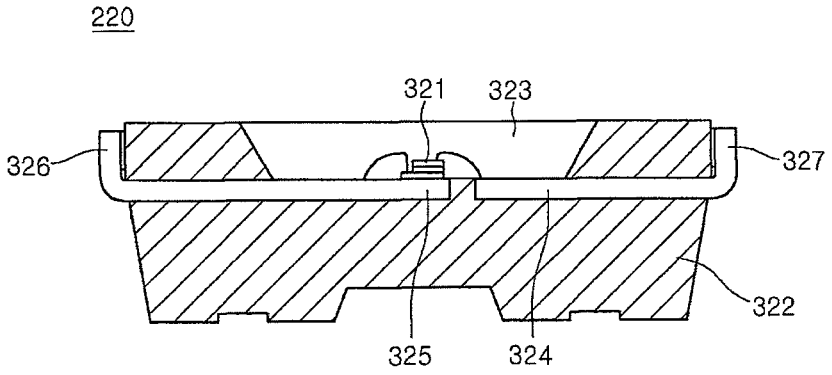
FIGS. 23 and 24 are cross-sectional views illustrating examples of a structure of a light source according to an embodiment of the present invention.
Figure 24:
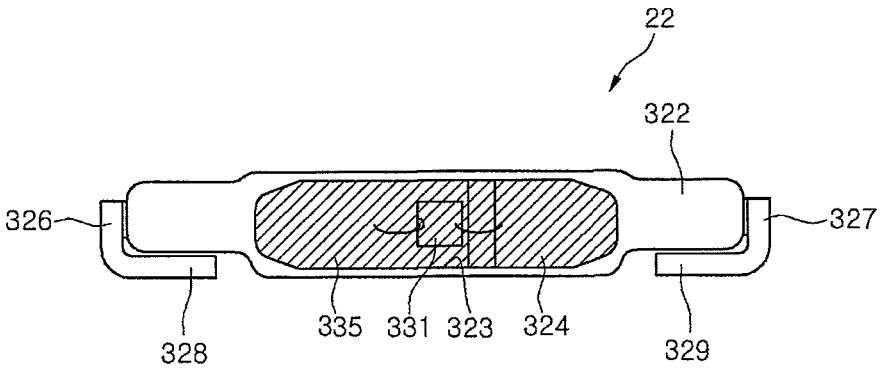

FIGS. 23 and 24 are diagrams illustrating one embodiment for a structure of a light source 200 provided in a backlight unit 200 according to the present invention. FIG.

23 illustrates the structure of the light source 220 seen from the side and FIG. 24 illustrates of a structure of the head part 22 of the light source 220 seen from the front. Any light source 220 discussed above and below according to the present invention can have the structure of the light source 220 of FIGS. 23 and 24.

Referring to FIG. 23, the light source 220 can be configured to include a light emitting device 321, a mold part 322 having a cavity 323, and a plurality of lead frames 324 and 325. According to the embodiment of the present invention, the light emitting device 321 may be or include a light emitting diode (LED) chip and the LED chip may be configured by a blue LED chip or an infrared ray LED chip or by at least one package type combining one or more chips of a red LED chip, a green LED chip, a blue LED chip, a yellow green LED chip, and a white LED chip.

Hereinafter, the embodiment of the present invention will be described by using a case in which the light source 220 is configured to include the LED chip 321 as the light emitting device for emitting light as an example.

The LED chip 321 is packaged to the mold part 322 configuring a body of the light source 220. For this, the cavity 323 can be formed at one side of the center of the mold part 322. Meanwhile, the mold part 322 can be injection-molded with a resin material such as polyphtalamide (PPA), etc. to a press (Cu/Ni/Ag substrate) and the cavity 323 of the mold part 322 can serve as a reflection cup. The shape or structure of the mold part 322 shown in FIG. 23 may be changed and is not limited thereto.

The plurality of lead frames 324 and 325 penetrate in a long axis direction of the mold part 322. Ends 326 and 327 of the lead frames can be exposed to the outside. Herein, a long-direction symmetrical axis of the mold part 322 is referred to as a long axis and a short-direction symmetrical axis of the mold part 322 is referred to as a short axis as viewed from the bottom of the cavity 323 where the LED chip 321 is disposed.

Semiconductor devices such as a light receiving device, a protection device, etc. may selectively be mounted on the lead frames 324 and 325 in the cavity 323 in addition to the LED chip 321. For example, the protection device such as a zener diode, etc. for protecting the LED chip 321 from static electricity, etc. (e.g., ESD: electro static discharge) may be mounted on the lead frames 324 and 325 in addition to the LED chip 321.

The LED chip 321 adheres to any one lead frame 325 positioned on the bottom of the cavity 323 and thereafter, the LED chip 321 can be connected by wire bonding or flip chip bonding.

Further, after the LED chip 321 is connected, a resin material is molded to the mounting region in the cavity 323. The resin material here includes a silicon or epoxy material. Phosphor may selectively be added to this resin material. The resin material can be formed in any one shape of a flat shape in which the surface of the resin material is molded with the same height as the top of the cavity 323, a concave lens shape concaved to the top of the cavity 232, and a convex lens shape convexed to the top of the cavity 323.

At least one side of the cavity 323 is inclined and this side may serve as a reflection surface for selectively reflecting an impinging light or a reflection layer. The cavity 323 may have a polygonal exterior shape and may have shapes other than the polygonal shape.

Referring to FIG. 24, the head part 22 of the light source 220 which is a part emitting the light can include a light emitting surface (displayed by an oblique line) actually emitting the light and a non-emitting surface not emitting the light, which is a part other than the light emitting surface.

More specifically, the light emitting surface of the head part 22 of the light source 220, which emits the light is formed by the mold part 322 and can be defined by the cavity 323 disposed in the LED chip 321. For example, the LED chip 321 is disposed in the cavity 323 of the mold part 322, such that the light emitted from the LED chip 321 can be emitted through the light emitting surface surrounded by the mold part 322. Further, the non-emitting surface of the head part 22 of the light source 220 may be a part (not displayed by the oblique line) where the mold part 322 is formed and the light is not emitted.

Further, as shown in FIG. 24, the light emitting surface of the head part 22 of the light source 220 has a shape in which a horizontal length is longer than a vertical length. However, the shape of the light emitting surface of the head part 22 is not limited to the shape shown in FIG. 24. For example, the light emitting surface of the light source 220 may have a rectangular shape.

In addition, the non-emitting surface of the head part 22 that does not emit the light may be positioned at upper, lower, left, or right side of the light emitting surface of the head part 22 of the light source 220.

Meanwhile, the ends of 326 and 327 of the lead frames 324 and 325 extend to the outer frame of the mold part 322 to be firstly formed and secondly formed in one groove of the mold part 322 to be disposed in first and second lead electrodes 328 and 329. Herein, the number of fabrication times may be changed and is not limited thereto.

The first and second lead electrodes 328 and 329 of the lead frames 324 and 325 can be formed to be received in grooves formed at both sides of the bottom of the mold part 322. Further, the first and second lead electrodes 328 and 329 are formed with a plate structure having a predetermined shape and may be formed with a shape in which solder bonding is easy in surface mounting.

Figure 25:
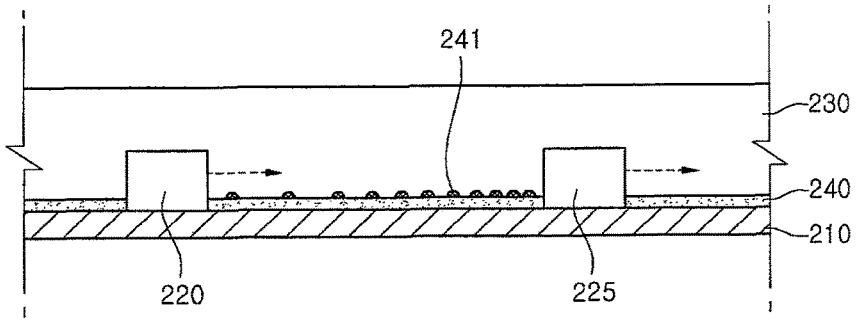
FIGS. 25 to 27 are cross-sectional views.

FIG. 25 is a cross-sectional view illustrating a configuration of a backlight unit according to a seventh embodiment of the present invention. Description of the same components of the backlight unit 200 shown in FIG. 25 as those explained by referring to FIGS. 1 to 24 will now be omitted.

A pattern 241 for allowing the light emitted from the light source 220 to easily advance to the adjacent light source 225 may be formed in the reflection layer 240. For example, referring to FIG. 25, the pattern 241 formed on the top of the reflection layer 240 may include a plurality of protrusions, and the light emitted from the light source 220 and inputted into the plurality of protrusions of the pattern 241 may be scattered or refracted in the advance direction.

Meanwhile, as shown in FIG. 25, the density of the protrusions (241) formed in the reflection layer 240 may increase outwardly as the protrusions (241) are separated from the light source 220, that is, close to the adjacent light source 225 (which is also the light source 220). For example, more protrusions may be formed between two adjacent light sources 220 and 225 as you move from the left to the right direction in FIG. 25. Accordingly, it is possible to prevent the luminance of the light emitted upwardly from a region remotely separated from the light source 220, e.g., a region close to the adjacent light source 225 from being reduced, thereby maintaining the luminance of the light provided from the backlight unit 200 more uniformly.

Further, the protrusions of the pattern 241 may be made of the same material as the reflection layer 240. In this case, the protrusion of the pattern 241 can be formed by processing the top of the reflection layer 240.

As a variation, the protrusions of the pattern 241 may be made of a material different from the reflection layer 240, for example, the protrusions of the pattern 241 may be formed on the top of the reflection layer 240 by printing the pattern shown in FIG. 25.

Meanwhile, the shape of the protrusions of the pattern 241 is not limited to the shape shown in FIG. 25 and for example, may have various shapes such as a prism shape, etc.

Figure 26:
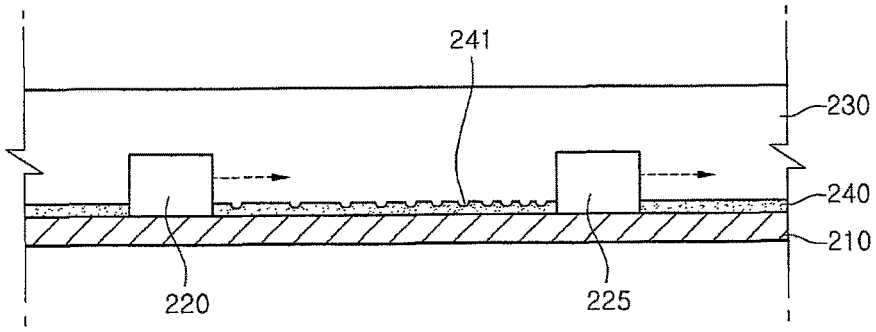

For example, as shown in FIG. 26, a pattern 241 may be formed on the reflection layer 240 and may have an engraving shape.

Figure 27:
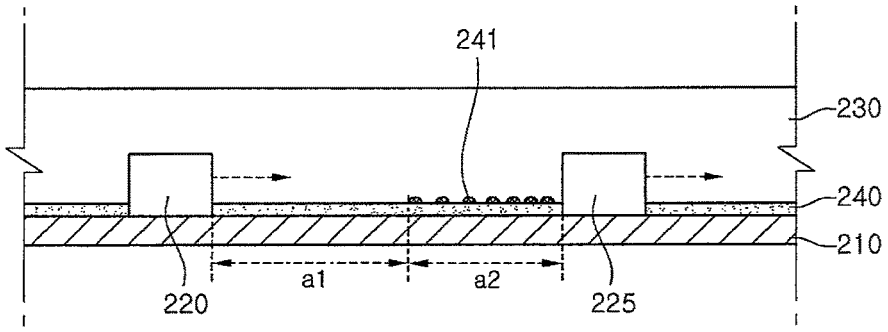

FIG. 27 is a cross-sectional view of another embodiment of a shape of a pattern 241 formed on the reflection layer 240 and the pattern 241 may be formed on only a partial region of the reflection layer 240.

Referring to FIG. 27, the reflection layer 240 may include a first regional where the engraving or embossing pattern 241 is not formed and a second region a2 where the pattern 241 is formed as described above.

Meanwhile, the first regional where the pattern 241 is not formed may be disposed more adjacent to the light source 220 that emits the light between the first and second regions a1 and a2.

As described above, the first regional where the pattern 241 is not formed is disposed adjacent to the light source 220, and the second region a2 where the pattern 241 is formed is disposed away from the light source 220 so as to efficiently transmit the light emitted from the light source 220 to a region far away from the light source 220.

Further, in the region far away from the light source, for example, the second region a2 where the pattern 241 is formed, the light emitted from the light source 220 is scattered by the pattern 241 and is thereby emitted upward, thereby preventing the luminance of the light from being reduced in the second region a2.

Further, as described above and shown in FIG. 27, in the second region a2 of the reflection layer 240, the density of the pattern 241 may increase in the light emission direction (e.g., the arrows shown in FIGS. 25-27) of the corresponding light source 220, e.g., the density of the pattern 241 increases as one moves farther away from the corresponding light source 220.

Figure 28:
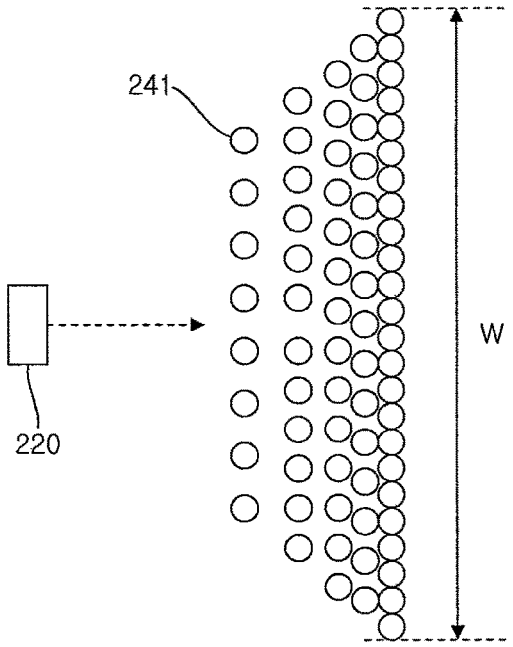
FIGS. 28 and 29 are plan views, illustrating configurations of a backlight unit according to a seventh embodiment of the present invention.

FIG. 28 illustrates an embodiment of an arrangement of patterns formed on the reflection layer and schematically illustrates the arrangement of a plurality of patterns 241 formed on the reflection layer 240 on the basis of the position of the light source 220.

Referring to FIG. 28, the width w of the region where the plurality of patterns 241 are formed may increase in the light emission direction, as one moves farther away from the light source 220 emitting the light to the reflection layer 240.

That is, the light emitted from the light source 220 may propagate while gradually being dispersed at a predetermined orientation angle, e.g., approximately 120 degrees primarily in a first direction (indicated by an arrow). Therefore, the width w of the region where the plurality of patterns 241 are formed may also increase in the light emission direction of the light source 220.

Figure 29:
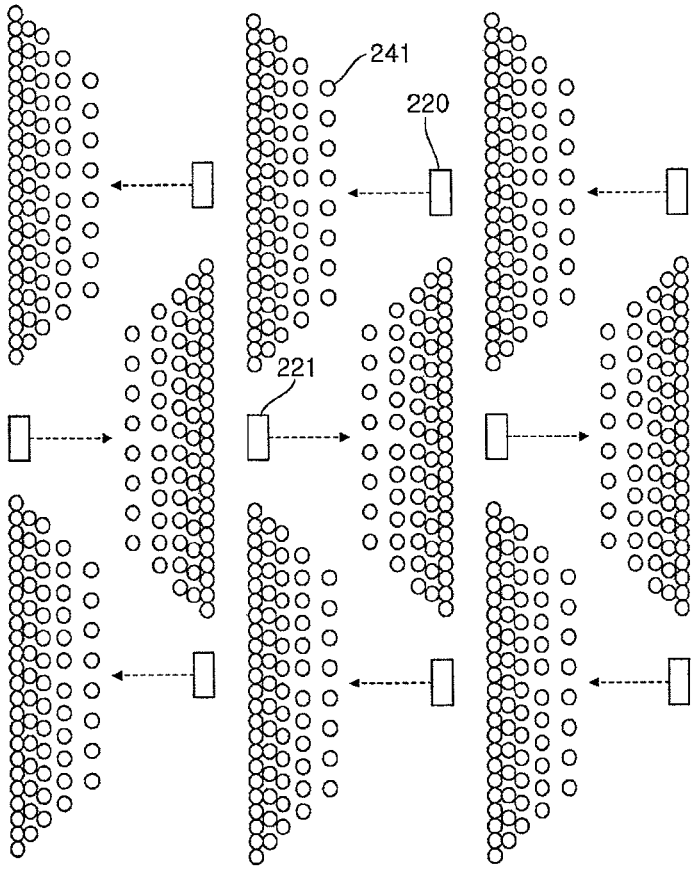

FIG. 29 illustrates another embodiment of arrangement of the patterns 241 formed on the reflection layer 240.

Referring to FIG. 29, the backlight unit 200 includes two or more light sources 220 and 221 that emit the light in different directions, and the patterns 241 arranged as shown in FIG. 29 may be formed on the reflection layer 240 to correspond to the positions of the light sources 220 and 221.

That is, the patterns 241 are not formed in the first region of the light source 220 immediately adjacent to the light source 220 in respect to the plurality of light sources 220 and 221 while the plurality of patterns 241 may be formed in the second region farther away from the corresponding light source 220. Here the first region is between the second region and the corresponding light source 220.

Meanwhile, for each light source 220, 221, the density and/or width W of the corresponding patterns 241 increases in the light emission direction of the corresponding light source.

Figure 30:
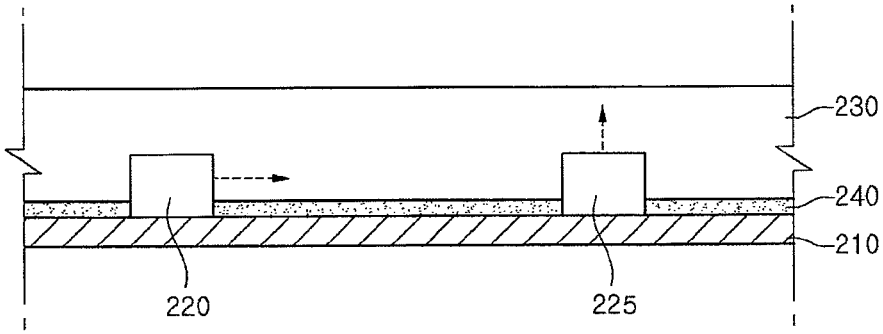
FIG. 30 is a cross-sectional view illustrating one embodiment of structures of a plurality of light sources that are provided in a backlight unit according to the present invention.

According to another embodiment of the present invention, the backlight unit 200 can include two or more light sources that emit light in different directions. For example, FIG. 30 is a cross-sectional view illustrating an embodiment for a structure of a plurality of light sources provided in a backlight unit 200 according to the invention. As shown in FIG. 30, the first light source 220 and the second light source 225 of the plurality of light sources provided in the backlight unit 200 may emit light in different directions.

For example, the first light source 220 emits the light in a lateral direction. For this, the first light source 220 can be configured by using the side view-type LED package. Meanwhile, the second light source 225 emits the light in an upward direction. For this, the second light source 225 can be configured by using the top view-type LED package. In the backlight unit 220, the plurality of light sources 220 can be alternatively the side view-type LED package and side view-type LED package.

As described above, according to the invention it is possible to prevent light from being focused on a predetermined region or being weakened, by configuring the backlight unit 200 by combining two or more light sources that emit the light in different directions. As a result, the backlight unit 200 can provide light having uniform luminance to the display panel 100.

Meanwhile, in FIG. 30, the embodiment of the present invention is described by using a case in which the first light source 220 emitting the light in the lateral direction and the second light source 225 emitting the light in the upward direction are disposed adjacent to each other as an example, but the present invention is not limited thereto. For example, within the backlight unit 200, two or more side view-type light sources may be disposed adjacent to each other, two or more top view-type light sources may be disposed adjacent to each other, or any combination thereof or any arrangement of thereof.

Hereinafter, various arrangements of the light sources 220 and 221 will be described in detail with reference to FIGS. 31 to 35.

FIG. 31 is a plan view illustrating a front shape of a backlight unit according to an embodiment of the present invention, and illustrates an embodiment for a layout structure of a plurality of light sources provided in the backlight unit 200 according to the invention. Any light source 220 discussed above in connection with FIGS. 1 to 30 can be the light source (e.g., 220, 221, 222, 224, etc.) of FIGS. 31 to 35. The various arrangements of the light sources 220 of FIGS. 31 to 35 can be used in the display module 20 or the like.

Referring to FIG. 31, the plurality of light sources 220 and 221 included in the backlight unit 200 may be disposed by being divided into a plurality of arrays, for example, a first light source array A1 and a second light source array A2.

Each of the first light source array A1 and the second light source array A2 includes a plurality of light source lines constituting light sources. For example, the first light source array A1 is composed of multiples lines L1, L1, . . . of the light sources 220, and the second light source array A2 is composed of multiple lines L2, L2, . . . of the light sources 220. The light source lines included in the first light source array A1 and the light source lines included in the second light source array A2 may be alternately disposed each other, to correspond to the displaying region of the display panel 100.

According to one embodiment of the present invention, the first light source array A1 may include odd number-th light source lines from the top among the plurality of light source lines, and the second light source array A2 may include even number-th light source lines from the top.

For example, as shown in FIG. 31, a first light source line L1 included in the first light source array A1 and a second light source line L2 included in the second light source array A2 are disposed adjacent to each other, and the first light source line L1 and the second light source line L2 are alternately disposed each other to configure the backlight unit 200. As such, the light sources of the backlight unit 200 are disposed in a matrix configuration.

Further, the light sources 220 included in the first light source array A1 and the light sources 221 included in the second light source array A2 may emit light in the same direction or in different directions. For example, referring to FIG. 32, the backlight unit 200 may include two or more light sources that emit light in different directions. That is, the light sources 220 included in the first light source array A1 and the light sources 221 included in the second light source array A2 may emit light in different directions from each other. For this, a direction which the light emitting surfaces of the light sources 220 included in the first light source array A1 face may be different from a direction which light emitting surfaces of the light sources 221 included in the second light source array A2 face.

Figure 32:
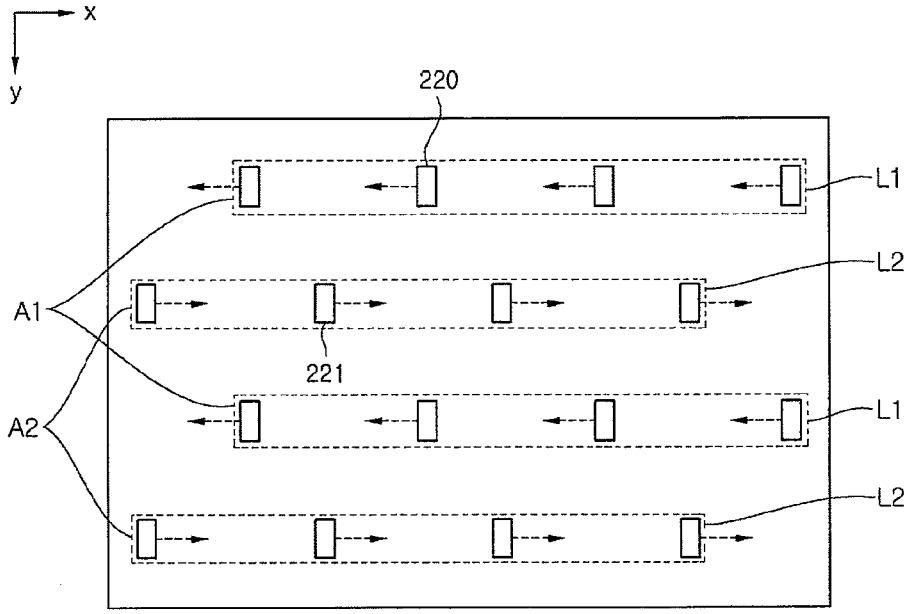

More specifically, the light emitting surface of each first light source 220 included in the first light source array A1 and the light emitting surface of each second light source 221 included in the second light source array A2 may face in different directions. Therefore, as shown in FIG. 32, the first light sources 220 included in the first light source array A1 and the second light sources 221 included in the second light source array A2 may emit light in different directions, e.g., in opposite directions. In this case, the light sources provided in the backlight unit 200 can emit the light in the lateral direction. For this, the light sources can be configured by using the side view-type LED packages.

Meanwhile, as shown in FIG. 32, the plurality of light sources provided in the backlight unit 200 can be disposed while forming two or more lines, and two or more light sources disposed on the same line can emit the light in the same direction.

For example, light sources right/left adjacent to the first light source 220 can also emit the light in the same direction as the first light source 220, e.g., in the direction opposite to the x-axis direction, and light sources right/left adjacent to the second light source 221 can also emit the light in the same direction as the second light source 221, e.g., in the x-axis direction.

As described above, by providing the light emitting directions of the light sources disposed adjacent to each other in the y-axis direction, for example, the first light source 220 and the second light source 221 to be opposite to each other, the present invention makes it possible to prevent the luminance of the light from being focused or being weakened in a predetermined region of the backlight unit 200.

For example, as the light emitted from the first light source 220 travels towards the adjacent light source, the light may be weakened. As a result, as the light is remotely separated from the first light source 220, the luminance of the light emitted in the direction of the display panel 100 may be weakened.

Accordingly, as shown in FIG. 32, by making the light emitting directions of the first light source 220 and the second light source 221 opposite to each other, the first light source 220 and the second light source 221 can complementarily prevent the luminance of the light from being focused in the region adjacent to the light source and the luminance of the light from being weakened in the region remotely separated from the light source, thereby maintaining the luminance of the light emitted from the backlight unit 200 uniformly.

Further, in the first light source lines L1 included in the first light source array A1 and the second light source lines L2 included in the second light source array A2, right and left positions of the light sources do not coincide with each other but cross each other. As a result, it is possible to improve further the uniformity of the light emitted from the backlight unit 200. For example, as shown in FIG. 32, the second light sources 221 included in the second light source array A2 may be disposed adjacent to the first light sources 220 included in the first light source array A1 in a diagonal direction.

Figure 33:
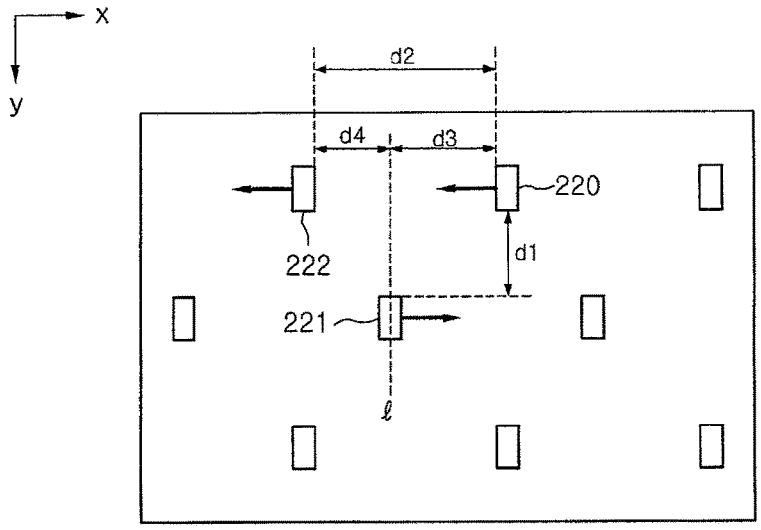

Referring to FIG. 33, the light sources in two or more light source lines in the first light source array A1 may line up vertically or substantially vertically, the light sources in two more light sources in the second light source array A2 may line up vertically or substantially. Further, the first light source line L1 and the adjacent second light source line L2 may be separated from each other by a predetermined distance d1.

That is, the first light sources 220 included in the first light source array A1 and the second light sources 221 included in the second light source array A2 may be separated from each other by the predetermined distance d1 on the basis of a y-axis direction vertical to an x-axis in which the light is emitted.

As the distance d1 between the first light and second light source lines L1 and L2 increases, a region which the light emitted from the first light source 220 or the second light source 221 cannot reach may be generated and thus, the luminance of the light in the region may be weakened.

Meanwhile, as the distance d1 between the first light and second light source lines L1 and L2 decreases, the light emitted from the first light sources 220 and the light emitted from the second light sources 221 may interfere with each other. In this case, the division driving efficiency of the light sources may be deteriorated.

Accordingly, in order to make the luminance of the light emitted from the backlight unit 200 uniform while reducing the interference of the light resources, the distance d1 of the light source lines, for example, the first and second light source lines L1 and L2 (220 and 221), which are adjacent in the same direction crossing the direction in which the light is emitted may be, e.g., 5 to 22 mm.

Further, the third light source 222 is included in the first light source line of the first light source array A1 and disposed adjacent to the first light source 220 in the x-axis direction, and the first light source 220 and the third light source 222 can be spaced from each other by a predetermined distance d2.

Further, a light orientation angle θ from the light source and a light orientation angle θ' in the resin layer 230 can have a relationship shown in Equation 1 by the Snell's law.

$$\frac{n1}{n2} = \frac{\sin\theta'}{\sin\theta} \quad \text{[Equation 1]}$$

Meanwhile, when a part that emits the light from the light source is an air layer (refractive index n1 is '1') and an orientation angle θ of the light emitted from the light source is generally 60 degrees, the light orientation angle θ' in the resin layer 230 can have a value shown in Equation 2 in accordance with Equation 1.

$$\sin\theta' = \frac{\sin 60^\circ}{n2} \quad \text{[Equation 2]}$$

Further, when the resin layer 230 is made of an acrylic resin type such as polymethyl methacrylate (PMMA), the resin layer 230 has a refractive index of approximately 1.5. Therefore, the light orientation angle θ' in the resin layer 230 can be approximately 35.5 degrees in accordance with Equation 2.

As described by referring to Equations 1 and 2, the light orientation angle θ' of the light emitted from the light source in the resin layer 230 can be less than 45 degrees. As a result, a range in which the light emitted from the light source advances in the y-axis direction can be smaller than a range in which the light advances in the x-axis direction.

Accordingly, the distance d1 between two light sources adjacent to each other in the direction crossing the light emitting direction, e.g., the first light source 220 and the second light source 221 can be smaller than the distance d2 between two light sources adjacent to each other in the light emitting direction, e.g., the first light source 220 and the third light source 222, thereby maintaining the luminance of the light emitted from the backlight unit 200 uniformly.

Meanwhile, by considering the distance d1 between the light source lines adjacent to each other, which has the above-mentioned range, the distance d2 between two light sources adjacent to each other in the light emitting direction, e.g., the first light source 220 and the third light source 222, can be 9 to 27 mm in order to maintain the luminance of the light emitted from the backlight unit 200 uniformly while reducing an interference between the light sources.

Referring to FIG. 33, the second light source 221 included in the second light source array A2 may be disposed to correspond to a position between the first light source 220 and the third light source 222 adjacent to each other, which are included in the first light source array A1 in a diagonal direction.

That is, the second light source 221 is disposed adjacent to the first light source 220 and the third light source 222 in the y-axis direction and can be disposed on a straight line 1 passing between the first light source 220 and the third light source 222.

In this case, a distance d3 between the straight line 1 on which the second light source 221 is disposed and the first light source 220 can be larger than a distance d4 between the straight line 1 and the third light source 222.

The light emitted from the second light source 221 advances in a direction opposite to the light emitting direction of the third light source 222 to thereby weakening or distributing the luminance of the light emitted in the direction of the display panel 100 in a region adjacent to the third light source 222.

Therefore, by disposing the second light source 221 closer to the third light source 222 than to the first light source 220, it is possible to compensate the decrease in the luminance of the light in the region adjacent to the third light source 222 by using the luminance of the light focused on the region adjacent to the second light source 221.

Meanwhile, at least one of the plurality of light sources 220 provided in the backlight unit 200 may emit the light more towards a horizontal direction, that is, in a direction slanted from the x-axis direction.

Figure 34:
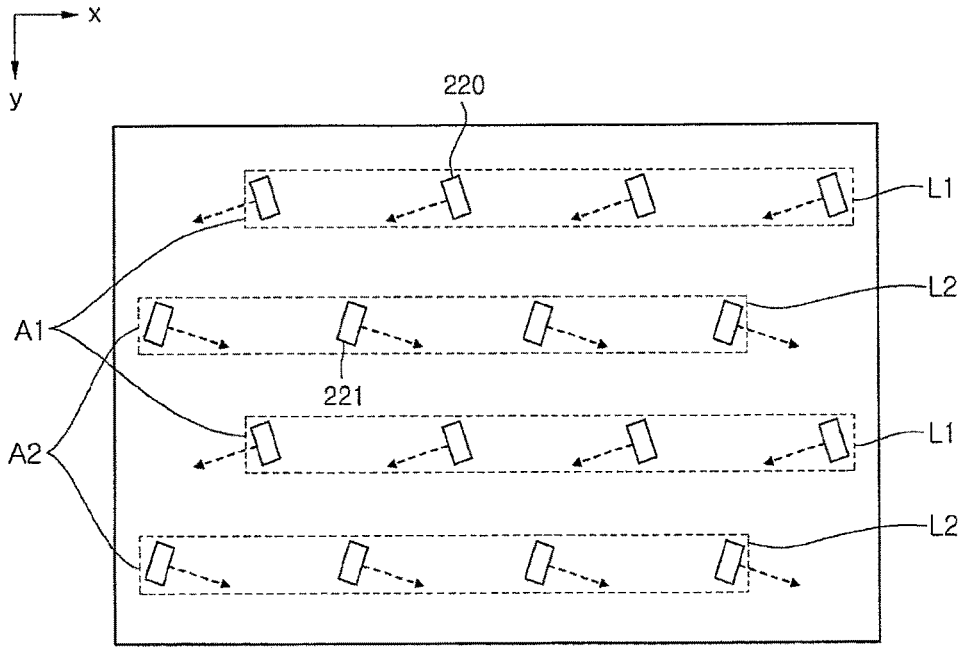

For example, referring to FIG. 34, directions in which the light emission surfaces of the light sources 220 and 221 face may be formed obliquely upwards or downwards at a predetermined angle on the basis of the x-axis direction.

Figure 35:
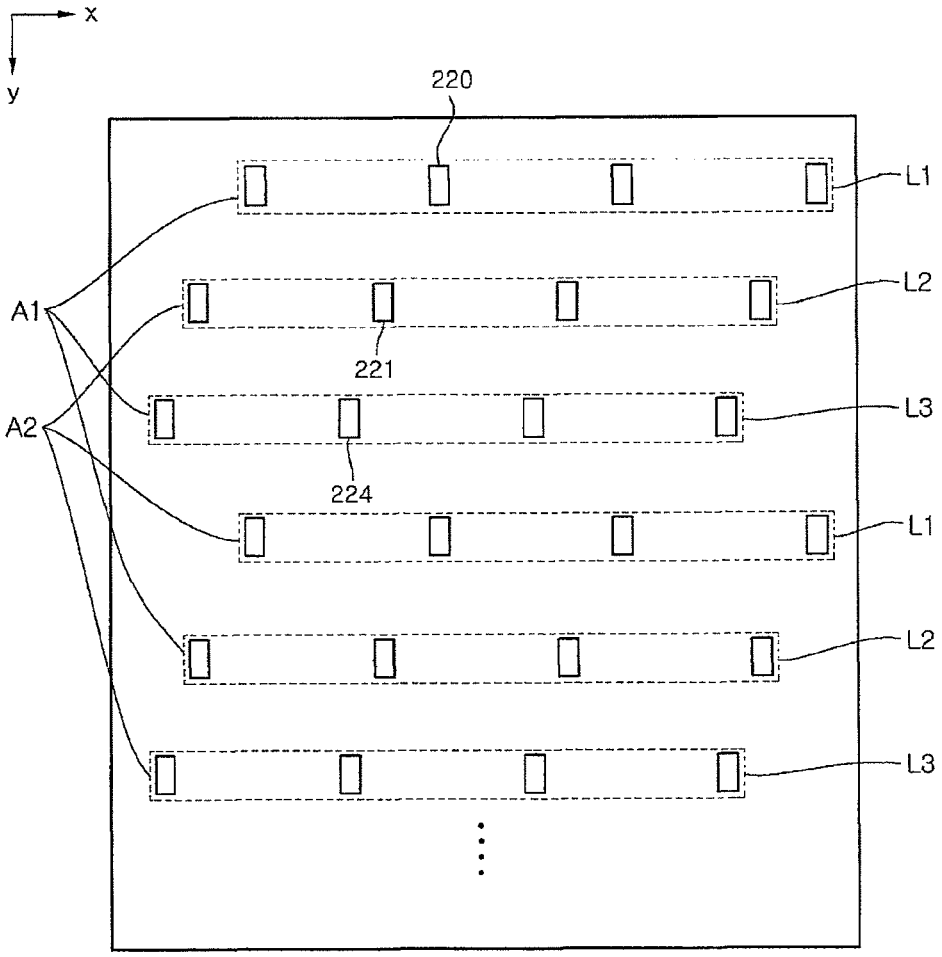

In another variation as shown in FIG. 35, the light sources in the light source lines can be staggered with respect to each other for the backlight unit 200. For example, the light sources in the lines L1, L3 and L2 of the first light source array A1 can be staggered with respect to the light sources in the lines L2, L1 and L3 of the second light source array A2.

Therefore, the lines L1, L3, and L2 included in the first light source array A1 and the lines L2, L1, and L3 included in the second light source array A2 may be alternatively disposed.

As such, the light sources 220, 221 and 224 may form a diagonal or slant line while the light sources in the lines L1 and L1 may correspond to each other. Other variations are possible. Preferably the light sources 220, 221, 224, 222, etc. are all basically the same light sources, but may have different light emitting directions; however, these light sources may have other varying characteristics if desired and may be of different type, size, orientation, etc.

FIGS. 36 to 39 are plan views illustrating various first examples of a structure of a reflection layer that is provided in a backlight unit according to an embodiment of the present invention.

Figure 36:
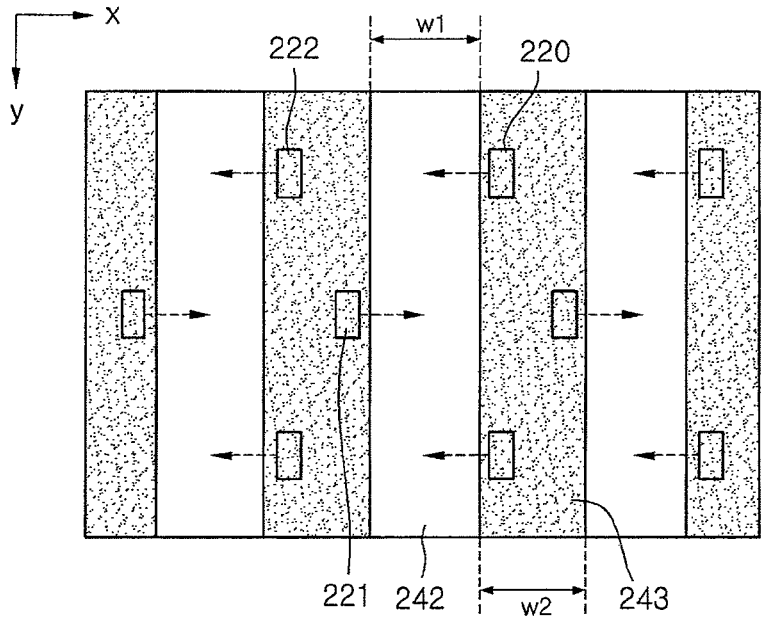
FIGS. 36 to 39 are plan views illustrating first examples of a structure of a reflection layer that is provided in a backlight unit according to the present invention.

Referring to FIG. 36, the reflection layer 240 provided in the backlight unit 200 according to the embodiments of the present invention can have two or more different portions having respectively different reflectances. For example, the reflection layer 240 can be configured to have different reflectances depending on a position where the reflection layer 240 is formed. The reflection layer 240 of FIG. 36 can be used as the reflection layer 240 discussed above and below in any other embodiment or example.

For example, the reflection layer 240 can include a first reflection layer (or portion) 242 and a second reflection layer (or portion) 243 that have different reflectances. The reflection layer 240 can be configured by alternatively disposing the first and second reflection layers 242 and 243 having different reflectances as shown.

For example, the reflectances of the first and second reflection layers 242 and 243 can be implemented to be different by forming the first and second reflection layers 242 and 243 by reflection sheets made of different materials or by adding a predetermined material to any one of the first and second reflection layers 242 and 243 formed by the same reflection sheet or processing the surface.

According to another example of the present invention, the first and second reflection layers 242 and 243 may be configured by one reflection sheet which is not physically separated. In this case, the first and second reflection layers 242 and 243 having different reflectances may be formed by forming a pattern for selectively adjusting the reflectance in at least a part of the reflection sheet.

As a result, it is possible to adjust the reflectance by forming the pattern in at least one area of an area of the reflection layer 240 corresponding to the first reflection layer 242 and an area of the reflection layer 240 corresponding to the second reflection layer 243. For example, by forming the pattern in an area of the reflection layer 240 configured by one sheet corresponding to the second reflection layer 243 shown in FIG. 36, it is possible to adjust the reflectance of the corresponding area.

More specifically, protruded patterns for diffusing light may be formed on the top of the area of the reflection layer 240 corresponding to the second reflection layer 243, thereby reducing the reflectance of the area corresponding to the second reflection layer 243. In this case, a light diffusion effect can be improved in the area of the reflection layer 240 corresponding to the second reflection layer 243. As a result, light emitted from the light source 220 can be more uniformly diffused to an area disposed in the adjacent light source 222.

A surface roughness of the first reflection layer 242 is different from a surface roughness of the second reflection layer 243. For example, the surface roughness of the first reflection layer 242 is higher than the surface roughness of the second reflection layer 243. As a result, a reflectance of the second reflection layer 243 is lower than a reflectance of the first reflection layer 242.

Meanwhile, the first reflection layer 242 of the first and second reflection layers 242 and 243 adjacent to the light sources 220, 221, and 222 ran be configured by a specular reflection sheet on the basis of the light emitting direction and the second reflection layer 243 can be configured by a diffuse reflection sheet. Incident light is reflected on the smooth surface of the specular reflection sheet, such that an incident angle and a reflection angle can be the same. Therefore, the first reflection layer 242 allows light obliquely inputted from the light sources 220, 221, and 222 to advance in a direction orienting the adjacent light source by reflecting the light at the reflection angle equal to the incident angle.

Meanwhile, in the diffuse reflection sheet, the incident light can be observed as reflected and diffused at various angles due to the diffused reflection generated on a rough surface with unevenness. Therefore, the second reflection layer 243 can propagate the light upwards by diffusing the light advancing from the light sources 220, 221, and 222.

According to one embodiment of the present invention, the second reflection layer 243 configured by, e.g., the diffuse reflection sheet can be formed by forming unevenness thereon by processing the surface of the reflection sheet or by applying or adding a diffuse reflection material, e.g., titanium dioxide (TiO2) with a predetermined density.

In this case, the reflectance of the first reflection layer 242 is set to be higher than the reflectance of the second reflection layer 243. Therefore, as described above, the light inputted from the light sources 220, 221, and 222 is specularly reflected at the same reflection angle in the first reflection layer 242 and the diffuse reflection is generated, such that the light can be emitted upward in the second reflection layer 243.

As described above, the light emitted from the light sources 220, 221, and 222 can effectively advance towards the adjacent light source by configuring the first reflection layer 242 adjacent to the light sources 220, 221, and 222 by the specular reflection sheet having a high reflectance on the basis of the light emitting direction. Therefore, it is possible to prevent the luminance of the light from being focused in the region immediately adjacent to the light sources 220, 221, and 222 and to prevent the luminance of the light from decreasing in the region remotely spaced from the light sources 220, 221, and 222.

As described above, the advancing light can effectively be emitted to the display panel 100 by configuring the second reflection layer 243 more remotely spaced from the light sources 220, 221, and 222 with the diffuse reflection sheet having a comparatively low reflectance on the basis of the light emitting direction. Therefore, according to the invention, it is possible to prevent the luminance of the light from decreasing in the region remotely spaced from the light sources 220, 221, and 222 by compensating for the luminance reduced as the light propagates once it is emitted from the light sources 220, 221, and 222.

Meanwhile, a specular reflection sheet constituting the first reflection layer 242 specularly reflects the light emitted from the light sources 220, 221, and 222 and propagates the light in the direction of the adjacent light source, and emits part of the incident light in the direction of the display panel 100 by reflecting or scattering the part of the incident light upwards.

The diffusion reflection sheet constituting the second reflection layer 243 may be manufactured by processing the surface of a sheet made of the same material as the specular reflection sheet or by forming the plurality of patterns that are protruded on the surface thereof.

According to the embodiment of the present invention, the luminance of the light in the region adjacent to the light sources 220, 221, and 222 and the luminance of the light in the region remotely spaced from the light sources 220, 221, and 222 can similarly be adjusted. Therefore, it possible to provide the uniform light luminance to the display panel 100 throughout the entire region of the backlight unit 200.

Preferably the width w1 of the first reflection layer 242 adjacent to the light sources 220, 221, and 222 can be larger than the width w2 of the second reflection layer 243 on the basis of the light emitting direction in order to allow the light emitted from the light sources 220, 221, and 222 to propagate properly towards the region where the adjacent light source is disposed. However, the width w1 may be the same as or less than the width W2 but the reflectances of the first and second reflection layers 242 and 243 may then vary as needed to achieve the desired effect.

Meanwhile, as the width w1 of the first reflection layer 242 decreases, the progressiveness of the light emitted from the light sources 220, 221, and 222 can be deteriorated. As a result, the luminance of the light in the region remotely spaced from the light sources 220, 221, and 222 can be decreased.

Further, when the width w1 of the first reflection layer 242 is still larger than the width w2 of the second reflection layer 243, the light can be focused in the region remotely spaced from the light sources 220, 221, and 222. For example, the luminance of the light in the middle region between the two adjacent light sources 220 and 222 can be lower than that in the region remotely spaced from the light sources 220, 221, and 222.

Accordingly, the light emitted from the light sources 220, 221, and 222 effectively advances towards the region where the adjacent light source is disposed and is emitted upwardly so as to provide the light having a uniform luminance to the display panel 100 throughout the entire region of the backlight unit 200. For this, the width w1 of the first reflection layer 242 can be 1.1 times to 1.6 times larger than the width w2 of the second reflection layer 243.

Referring to FIG. 36, the first light source 220 and the second light source 221 that are disposed adjacent to each other in the y-axis direction can be disposed at a position not overlapped with the first reflection layer 242, that is, outside of the region where the first reflection layer 242 is formed.

Further, the third light source 222 and the second light source 221 that are adjacent to the first light source 220 in the x-axis direction can be disposed in the region where the second reflection layer 243 is formed.

For example, holes or indentations (not shown) into which the second light source 221 and the third light source 222 can be inserted can be formed in the second reflection layer 243. As a result, the second and third light sources 221 and 222 mounted on the substrate 210 disposed below the second reflection layer 243 protrude upwardly through the hole of the second reflection layer 243 to thereby emit the light in the lateral direction.

Meanwhile, since the positions of the light sources 220, 221, and 222 shown in FIG. 36 are just one embodiment of the present invention, the positional relationship between the light sources 220, 221, and 222, and the first and second reflection layers 242 and 243 may vary.

Figure 37:
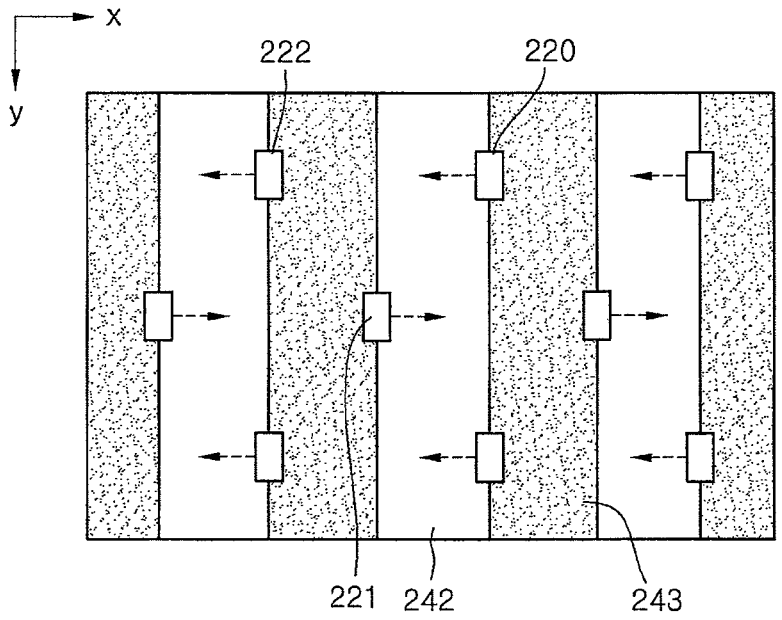

For example, referring to FIG. 37, each of the light sources 220 and 221, and 222 may be formed along a boundary between the first reflection layer 242 and the second reflection layer 243.

Figure 38:
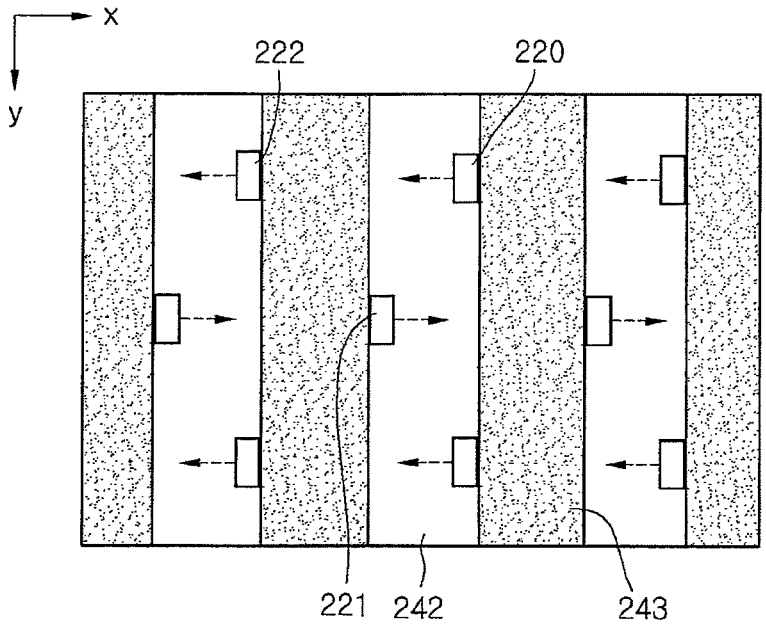

In another example, as shown in FIG. 38, the light sources 220, 221, and 222 may be positioned all within the region where the first reflection layer 242 is formed. And these light sources can be touching the boundary between the first and second reflection layer 242 and 243.

Figure 39:
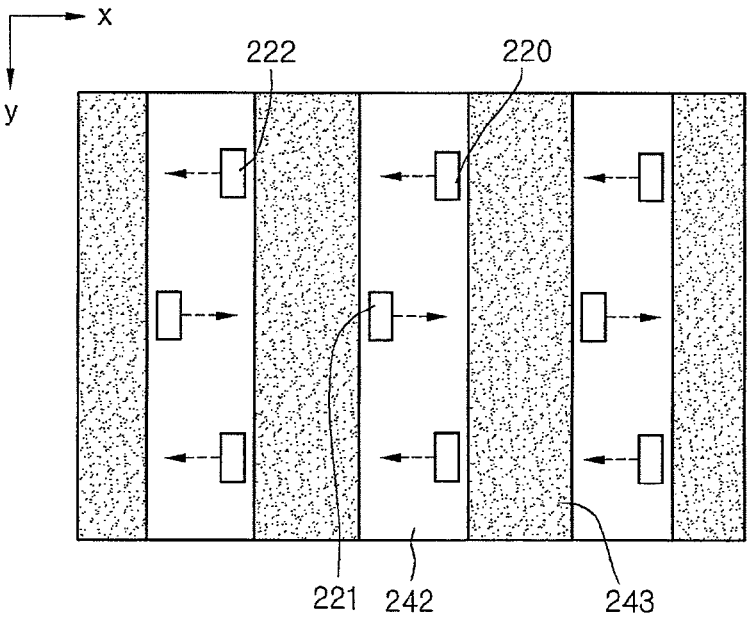

In still another example, referring to FIG. 39, the light sources 220 and 221, and 222 may be formed all within the region where the first reflection layer 242 is formed while being spaced from the boundary between the first reflection layer 242 and the second reflection layer 243.

According to the embodiment of the present invention, a gradation area where the light reflectance gradually increases or decreases may be formed at a boundary between the first and second reflection layers 242 and 243 that have different reflectances For example, the light reflectance may gradually decrease from one side of the gradation area adjacent to the first reflection layer 242 to the other side adjacent to the second reflection layer 243.

Meanwhile, the pattern 241 formed on the reflection layer 240 explained by referring to FIGS. 25 to 29 may be formed on both the first reflection layer 242 and the second reflection layer 243 or any one layer of them.

For example, the pattern 241 may be formed on the second reflection layer 243 further separated from the light source 220 on the basis of the direction (indicated by the arrow in FIG. 36) in which the light travels between the first and second reflection layers 242 and 243. Therefore, it is possible to prevent the luminance of the light source from being reduced in an area far away from the light source 220.

Figure 40:
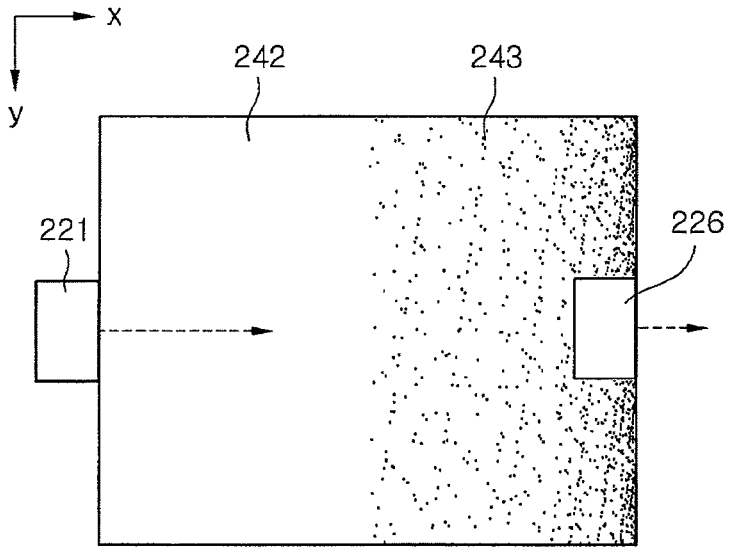
FIG. 40 is a plan view illustrating a second example of a structure of a reflection layer that is provided in a backlight unit according to the present invention.

FIG. 40 is a plan view illustrating a second example for a structure of a reflection layer provided in a backlight unit according to the present invention. Description of the same components of the illustrated reflection layer 240 as those explained by referring to FIGS. 36 to 39 will now be omitted.

Referring to FIG. 40, the reflectance of the second reflection layer 243 can gradually increase or decrease depending on the position of the second reflection layer 243.

According to the embodiment of the present invention, the reflectance of the second reflection layer 243 can gradually decrease in the direction (x-axis direction) in which the light is emitted from the light source 221.

For example, the reflectance of the second reflection layer 243 has the highest reflectance, i.e., the reflectance similar to the reflectance of the first reflection layer 242 at or around the boundary between the second reflection layer 243 and the first reflection layer 242. The reflectance of the second reflection layer 243 can gradually decrease in the x-axis direction as one moves away from the first reflection layer 242.

As described above, the reflectance at or around the boundary between the first reflection 242 and the second reflection layer 243 can gently be changed by configuring the reflectance of the second reflection layer 243 and as a result, it is possible to reduce or avoid a difference of the light luminance generated due to a rapid change in the reflectance at the boundary.

The second reflection layer 243 can be configured by the diffuse reflection sheet as described above. In this case, a diffuse reflection material may be formed in the second reflection layer 243. Therefore, it is possible to gradually decrease or increase the reflectance of the second reflection layer 243 depending on the position by gradually increasing or decreasing the concentration of the diffuse reflection material formed in the second reflection layer 243.

For example, as shown in FIG. 40, the concentration of titanium dioxide ($TiO_2$) which is one example of the diffuse reflection material formed in the second reflection layer 243 can gradually be increased in the direction (e.g., x-axis direction) in which the light is emitted from the light source 221. Therefore, the reflectance of the second reflection layer 243 can gradually be decreased effectively.

Figure 41:
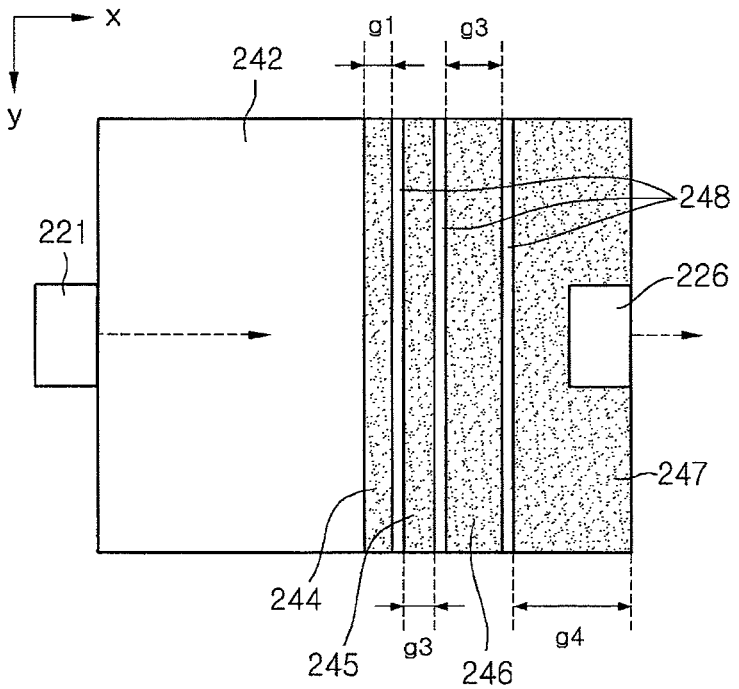
FIG. 41 is a plan view illustrating a third example of a structure of a reflection layer that is provided in a backlight unit according to the present invention.

FIG. 41 is a plan view illustrating a third example for a structure of a reflection layer that is provided in a backlight unit according to the present invention. This example may be identical to that shown in FIG. 40, except that the second reflection layer 243 is now composed of differently divided portions having different reflectances.

Referring to FIG. 41, the second reflection layer 243 can include a plurality of first reflection units 244 and a plurality of second reflection units 248 having different a reflectance from that of the first reflection unit 244, which are alternatively and repetitively disposed (not shown). In another example as shown in FIG. 41, the second reflection layer 243 can be composed of a plurality of first reflection units 244, 245, 246, and 247 and a plurality of second reflection units 248 alternatively disposed.

In this case, widths g1, g2, g3, and g4 of the first reflection units 244, 245, 246, and 247 included in the second reflection layer 243 can gradually increase on the basis of the direction (e.g., x-axis direction) in which the light is emitted from the light source 221.

Meanwhile, the reflectance of the first reflection units 244, 245, 246, and 247 can be smaller than the reflectance of the second reflection unit 248 and the reflectance of the second reflection unit 248 can be equal to the reflectance of the first reflection layer 242. That is, the second reflection unit 248 can be included in the first reflection layer 242.

For example, the second reflection unit 248 included in the first reflection layer 242 and the second reflection layer 243 can be configured by the above-mentioned specular reflection sheet, and the first reflection units 244, 245, 246, and 247 included in the second reflection layer 243 can be configured by the diffuse reflection sheet.

Therefore, the average reflectance of the second reflection layer 243 can be lower than the reflectance of the first reflection layer 242 to thereby provide a more uniform luminance of the light throughout the entire region of the backlight unit 200.

Meanwhile, as shown in FIG. 41, as the widths g1, g2, g3, and g4 of the first reflection units 244, 245, 246, and 247 are increased in the X-axis direction as the first reflection units are positioned farther from the light source 221, the reflectance of the second reflection layer 243 can be gradually decreased like the example shown in FIG. 40.

Therefore, the reflection at or near the boundary between the first reflection layer 242 and the second reflection layer 243 can be gently changed, such that it is possible to reduce the difference in the luminance of the light generated due to the rapid change in the reflectance at the boundary.

In the above description, the embodiments of the present invention have been described by using a case in which the reflectance of the second reflection layer 243 is changed depending on its position while the first reflection layer 242 has a uniform reflectance with reference to FIGS. 40 and 41, but the present invention is not limited thereto.

That is, in another example, while the second reflection layer 243 has the uniform reflectance, the reflectance of the first reflection layer 242 may be changed depending on its position, such that the reflectance at the boundary between the first and second reflection layers 242 and 243 can be gently changed. In still another example, the reflectance of each of the first and second reflection layers 242 and 243 may be changed depending on their positions.

Figure 42:
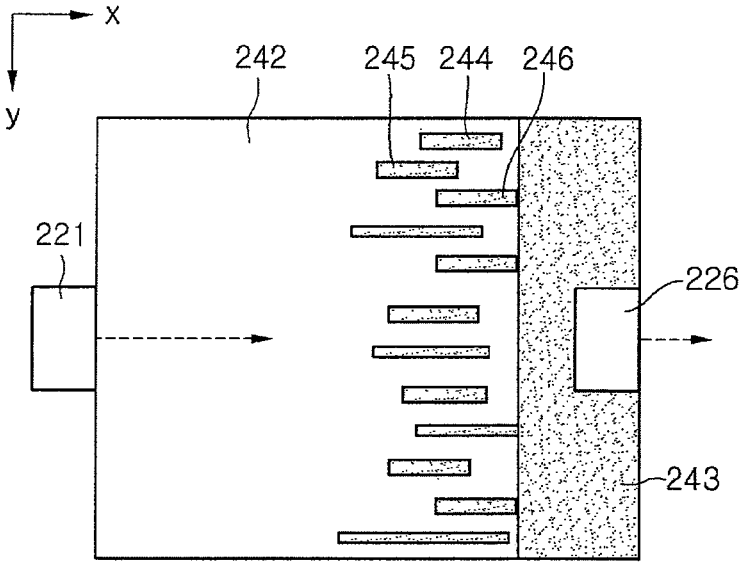
FIG. 42 is a plan view illustrating a forth example of a structure of a reflection layer that is provided in a backlight unit according to the present invention.

FIG. 42 is a plan view illustrating a fourth embodiment of the structure of a reflection layer provided in a backlight unit according to the present invention. A description of the same components of the illustrated reflection layer 240 shown in FIG. 42 as those explained by referring to FIGS. 36 to 41 will now be omitted.

Referring to FIG. 42, a plurality of reflection portions 244, 245, and 246 may be formed in a part of the region where the first reflection layer 242 is formed, which is adjacent to the second reflection layer 243.

The plurality of reflection portions 244, 245, and 246 may extend in the direction in which the light is emitted from the light source 221, that is, the x-axis direction in this example. The plurality of reflection portions 244, 245, and 246 may have different sizes, shapes, and/or reflectances and may be made of different materials.

The reflectances of the reflection portions 244, 245, and 246 may be smaller than the reflectance of the first reflection layer 242 and may be equal to the reflectance of the second reflection layer 243.

For example, the reflection portions 244, 245, and 246 and the second reflection layer 243 may be constituted by the diffusion reflection sheets.

The positions of the light sources 221 and 226 shown in FIGS. 40 to 42 are just one example of the present invention. As such, the positions of the light sources 221 and 226 may vary as described by referring to FIGS. 36 to 39.

Figure 43:
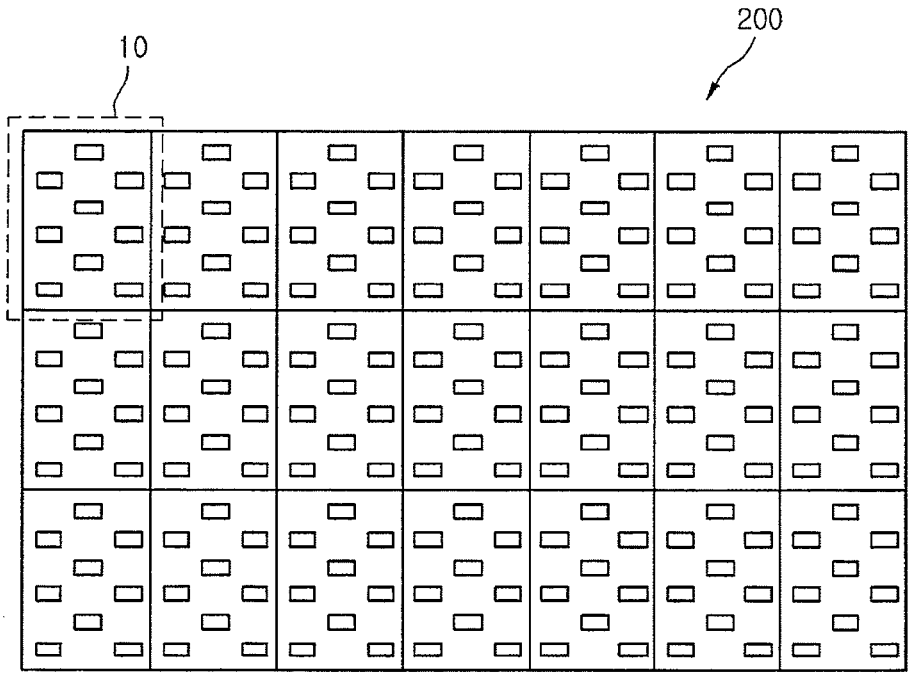
FIG. 43 is a plan view illustrating one embodiment of a configuration of a backlight unit with a plurality of optical assemblies according to the present invention.

FIG. 43 is a cross-sectional view illustrating a configuration of a backlight unit according to yet another embodiment of the present invention.

Referring to FIG. 43, the first layer 210, the plurality of light sources 220 formed on the first layer 210, the second layer 230 covering the plurality of light sources 220, and the reflection layer 240 that are described with reference to FIGS. 3 to 42 can configure one optical assembly 10, and one backlight unit 200 can be configured by disposing a plurality of such optical assemblies 10 adjacent to each other.

Meanwhile, in the case of the plurality of optical assemblies 10 provided in the backlight unit 200, N and M (N or M represents a natural number of 1 or more) optical assemblies can be disposed as a matrix type in the x-axis direction and the y-axis direction, respectively.

As shown in FIG. 43, in the backlight unit 200, twenty-one (21) optical assemblies 10 can be disposed in 7×3 matrix. However, since the configuration shown in FIG. 43 is just one example for describing the backlight unit according to the present invention, the present invention is not limited thereto and can be changed depending on a screen size of the display apparatus, etc.

For example, in the case of a display apparatus having a 47-inch size, the backlight unit 200 can be configured by disposing 240 optical assemblies 10 in 24×10 matrix.

Each of the optical assemblies 10 can be fabricated as an independent assembly and the optical assemblies 10 are adjacent to each other to form a module-type backlight unit. The module-type backlight unit as a backlight means can provide the light to the display panel 100.

As described above, the backlight unit 200 can be driven by a full driving scheme or a partial driving scheme such as local dimming, impulsive, etc. The driving scheme of the backlight unit 200 can be variously changed depending on the circuit design and is not limited thereto. As a result, in the embodiment, a color contrast ratio is increased and images for a bright part and a dark part can be clearly expressed, such that an image quality is improved.

For example, the backlight unit 200 operates by being divided into a plurality of division driving regions, and the luminance of the dark part is increased and the luminance of the bright part is decreased by linking the luminance of the division driving region with the luminance of a picture signal, thereby improving a contrast ratio and definition of the display apparatuses.

For example, it is possible to emit the light upwardly by independently driving only some of the plurality of optical assemblies 10 shown in FIG. 43. For this, the light sources 220 included in each of the optical assemblies 10 can be independently controlled.

Meanwhile, a region of the display panel 100 corresponding to one optical assembly 10 can be divided into two or more blocks. The display panel 100 and the backlight unit 200 may be separately driven by the unit of a block.

According to the embodiment of the present invention, the backlight unit 200 is divided into a plurality of blocks to be driven for each of the divided blocks, and decreases the luminance of a black/dark part of an image and increases the luminance of a bright part of the image by linking the luminance of each of the divided blocks with the luminance of the video signals so as to improve a contrast ratio and sharpness of the image.

For example, when the backlight unit 200 is driven in a local dimming scheme, the display panel 100 may have a plurality of division regions to correspond to the blocks of the backlight unit, respectively. The brightness of the light emitted from each of the blocks of the backlight unit 200 may be adjusted depending on a luminance level of each of the division regions of the display panel 100, e.g., a peak value of a gray level or a color coordinate signal.

That is, the plurality of light sources included in the backlight unit 200 may be divided into the plurality of blocks and may be driven for each of the divided blocks.

The block is a basic unit to which a specific driving power for driving the corresponding light sources in that block is applied. That is, the light sources included in one block are turned on or turned off at the same time and when the light sources in one block are turned on, these light sources in one block may emit light having the same luminance Further, the light sources included in different blocks in the backlight unit 200 may emit lights having different luminances by being supplied with different driving powers.

By configuring the backlight unit 200 by assembling the plurality of optical assemblies 10 according to the invention, it is possible to simplify a manufacturing process of the backlight unit 200 and improve productivity by minimizing a loss which can be generated in the manufacturing process. Further, the backlight unit 200 has an advantage applicable to backlight units having various sizes through mass production by standardizing the optical assembly 10.

Meanwhile, when any one of the plurality of optical assemblies 10 provided in the backlight unit 200 has a failure, only the optical assembly having the failure has to be replaced without replacing the entire backlight unit 200. Therefore, a replacing work is easy and a part replacement cost is saved.

Figure 44:
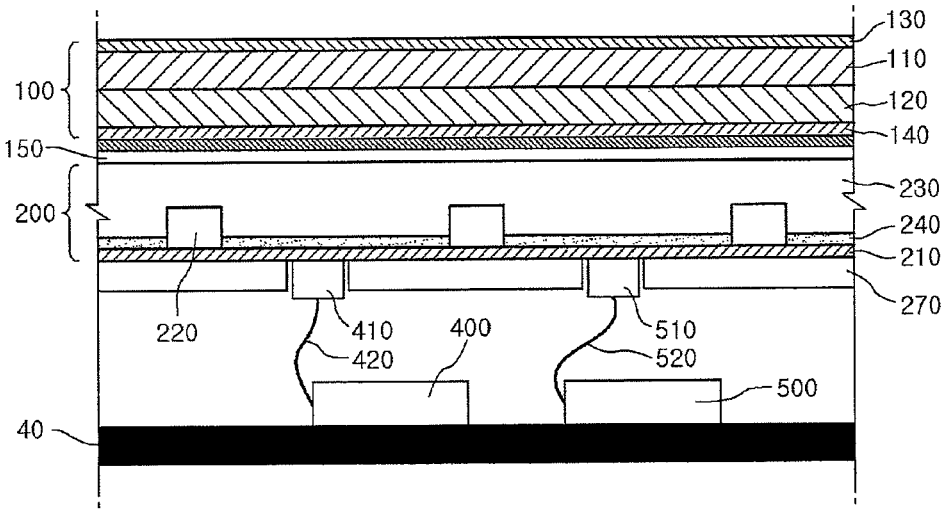
FIG. 44 is a cross-sectional view illustrating a configuration of a display apparatus according to an embodiment of the present invention.

FIG. 44 is a cross-sectional view illustrating a configuration of a display apparatus according to an embodiment of the present invention. Description of the same components of the illustrated display apparatus as those explained by referring to FIGS. 1 to 43 will now be omitted. The display apparatus of FIG. 44 can be the display apparatus having the backlight unit(s) and other features discussed in connection with FIGS. 1 to 43.

Referring to FIG. 44, the display panel 100 including the color filter substrate 110, the TFT substrate 120, the upper polarizer 130, and the lower polarizer 140, and the backlight unit 200 including the substrate 210, the plurality of light sources 220, and the resin layer 230 can closely adhere to each other.

For example, an adhesive layer 150 is formed between the backlight unit 200 and the display panel 100, such that the backlight unit 200 can be adhesively fixed to the bottom of the display panel 100. More specifically, the top of the backlight unit 200 can adhere to the bottom of the lower polarizer 140 by using the adhesive layer 150.

The backlight unit 200 can further include a diffuse sheet (not shown) and the diffuse sheet (not shown) can closely adhere to the top of the resin layer 230. In this case, the adhesive layer 150 can be formed between the diffuse sheet (not shown) of the backlight unit 200 and the lower polarizer 140 of the display panel 100.

Further, a bottom cover 270 can be disposed in a lower part of the backlight unit 200 and for example, as shown in FIG. 44, the bottom cover 270 can closely adhere to the bottom of the substrate 210. The bottom cover 270 may be configured by a protection film for protecting the backlight unit 200.

Meanwhile, the display apparatus can include a power supply unit 400 for supplying driving voltages to the display module 20, e.g., the display panel 100 and the backlight unit 200. For example, the plurality of light sources 220 provided in the backlight unit 200 are driven by using the voltages supplied from the power supply unit 400 to emit the light.

As shown in FIG. 44, the power supply unit 400 can be disposed and fixed onto the back cover 40 covering a back surface of the display module 20, such that the power supply unit 400 can be stably supported and fixed.

According to the embodiment of the present invention, a first connector 410 can be formed on the substrate 210. For this, a hole or indentation for inserting the first connector 410 therein can be formed in the bottom cover 270.

The first connector 410 electrically connects the power supply unit 400 with the light source 220 to allow the driving voltage to be supplied from the power supply unit 400 to the light source 220. For example, the first connector 410 is formed on the bottom of the substrate 210 and is connected to the power supply unit 400 through a first cable 420 to allow the driving voltage supplied from the power supply unit 400 to be transmitted to the light source 220 through the first cable 420.

An electrode pattern (not shown), e.g., a carbon nanotube electrode pattern can be formed on the top of the substrate 210. The electrode formed on the top of the substrate 210 is in contact with the electrode formed in the light source 212 to electrically connect the light source 220 with the first connector 410.

Further, the display apparatus can include a control unit 500 for controlling the driving of the display panel 100 and the backlight unit 200. For example, the control unit 500 can be a timing controller. The timing controller controls a driving timing of the display panel 100. More specifically, the timing controller generates a signal for controlling the driving timings of a data driver unit, a gamma voltage generator, and a gate driver that are provided in the display panel 100 to supply the generated signal to the display panel 100.

Meanwhile, the timing controller synchronizes with the driving of the display panel 100 and can supply a signal for controlling the driving timing of the light sources 220 to the backlight unit 200, such that the backlight unit 200, more specifically, the light sources 220 operate.

As shown in FIG. 44, the control unit 500 can be disposed and fixed onto the back cover 40 covering a back surface of the display module 20, such that the control unit 500 can be stably supported and fixed.

According to the embodiment of the present invention, a second connector 510 can be formed on the substrate 210. For this, a hole or indentation for inserting the second connector therein 510 can be formed in the bottom cover 270. The second connector 510 electrically connects the control unit 500 with the substrate 210 to allow a control signal outputted from the control unit 500 to be supplied to the substrate 210. For example, the second connector 510 is formed on the bottom of the substrate 210 and is connected to the control unit 500 through a second cable 520 to allow the control signal supplied from the control unit 500 through the second cable 520 to be transmitted to the substrate 210.

Meanwhile, a light source driving unit can be formed in the substrate 210. The light source driving unit can drive the light sources 220 by using the control signals supplied from the control unit 200 through the second connector 510.

The configuration of the display apparatus shown in FIG. 44 is just one example of the present invention. Therefore, the positions or numbers of the power supply unit 400, the control unit 500, the first and second connector 410 and 420, and the first and second cables 420 and 520 can be changed as necessary. For example, the first and second connector 410 and 420 can be provided in each of the plurality of optical assemblies 10 configuring the backlight unit 200 as shown in FIG. 43. The power supply unit 400 or the control unit 500 can be disposed on the bottom of the bottom cover 270.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiments or examples of the invention is also part of the invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, components specifically described in each of the embodiments and examples of the present invention can be modified. In addition, it should be appreciated that differences related to the modification and application fall within the scope of the present invention, which is prescribed in the appended claims.

What is claimed is:

[1. An optical assembly, comprising:

a first layer;

a plurality of light sources disposed over the first layer;

a second layer that is disposed above the first layer and covering the plurality of light sources; and a pattern layer disposed above or in the second layer, wherein the pattern layer includes a plurality of patterns, which are respectively corresponding to the plurality of light sources and are formed with a different material from the second layer by depositing, printing, or coating, each of the plurality of patterns corresponds to one of the plurality of light sources that is located closest to said each of the plurality of patterns, at least one of the light sources has a light emitting surface that faces a lateral direction and emits light to the side, a center of at least one of the patterns is disposed a predetermined distance from a center of the corresponding closest light source in the lateral direction, and a width of each of the plurality of patterns in the lateral direction is greater than a width of the corresponding closest light source in the lateral direction.]

[2. The optical assembly according to claim 1, wherein at least one of the light sources emits the light to the side at a predetermined orientation angle.]

[3. The optical assembly according to claim 1, wherein at least one of the patterns included in the pattern layer reflects at least part of light emitted from the plurality of light sources.]

[4. The optical assembly according to claim 1, wherein at least one of the patterns is formed on a transparent film and includes a plurality of dots.]

[5. The optical assembly according to claim 4, wherein a density of the plurality of dots for the at least one of the patterns decreases outwardly from a portion of the at least one of the patterns.]

[6. The optical assembly according to claim 5, wherein the portion of the at least one of the patterns corresponds to a center portion of the corresponding light source.]

[7. The optical assembly according to claim 1, wherein at least one of the patterns has a reflectance that decreases outwardly from a portion of the at least one of the patterns corresponding to a center portion of the corresponding light source.]

[8. The optical assembly according to claim 1, wherein at least one of the patterns has a portion that transmits at least part of a light emitted from the corresponding light source.]

[9. The optical assembly according to claim 1, wherein an outer edge portion of the at least one of the patterns is aligned with a light emitting surface of said corresponding light source.]

[10. The optical assembly according to claim 1, wherein the at least one of the patterns in its entirety is disposed a predetermined distance from a light emitting surface of said corresponding light source in the first direction.]

[11. The optical assembly according to claim 1, wherein an opening ratio of the pattern layer is at least 70%.]

[12. The optical assembly according to claim 1, wherein at least one of the patterns has one of a circle shape, a cylinder shape, an oval shape and a rectangle shape.]

[13. The optical assembly according to claim 1, wherein at least one of the patterns includes at least one of metal and metal oxide.]

[14. The optical assembly according to claim 1, wherein at least one of the patterns includes titanium dioxide ($TiO_2$).]

[15. The optical assembly according to claim 1, wherein at least one of the patterns is formed with pattern portions disposed above the corresponding light source, the pattern portions having a convex shape, a concave shape, a semi-circle shape, or a triangle shape.]

[16. The optical assembly according to claim 1, wherein the second layer includes a plurality of particles.]

[17. The optical assembly according to claim 1, further comprising:

a third layer disposed above the second layer and the pattern layer, wherein the third layer includes a plurality of particles.]

[18. The optical assembly according to claim 1, wherein a thickness of the second layer is approximately 0.1 to 4.5 mm.]

[19. The optical assembly according to claim 1, wherein the second layer encapsulates the plurality of light sources on the first layer.]

[20. A backlight unit, comprising:

at least one optical assembly of claim 1.]

[21. A display apparatus, comprising:

a backlight unit including at least one optical assembly of claim 1; and a display panel positioned above the backlight unit, wherein the backlight unit is divided into a plurality of blocks and is selectively drivable for the divided blocks.]

[22. The display apparatus according to claim 21, wherein the light sources of the backlight unit are disposed to correspond to a display region of the display panel.]

[23. The display apparatus according to claim 21, wherein the display panel is divided into a plurality of areas, and a luminance of light emitted from one of the blocks of the backlight unit corresponding to one of the areas is adjusted depending on a gray level peak value or a color coordinate signal of the areas.]

[24. An optical assembly, comprising:

a first layer;

a plurality of light sources disposed over the first layer; and a second layer disposed above the first layer and covering the plurality of light sources, the second layer including a plurality of patterns respectively corresponding to the plurality of light sources for selectively reflecting light emitted from the plurality of light sources, wherein each of the plurality of patterns corresponds to one of the plurality of light sources that is located closest to said each of the plurality of patterns, the plurality of patterns are formed by depositing, printing, or coating, at least one of the light sources has a light emitting surface that faces a lateral direction and emits light to the side, a center of at least one of the patterns is disposed a predetermined distance from a center of the corresponding closest light source in the lateral direction, and a width of each of the plurality of patterns in the lateral direction is greater than a width of the corresponding closest light source in the lateral direction.]

[25. The optical assembly according to claim 24, wherein the plurality of patterns are formed on the second layer or in the second layer.]

[26. The optical assembly according to claim 24, wherein a thickness of the second layer is approximately 0.1 to 4.5 mm.]

*27. A backlight unit, comprising:*

*a substrate;*

*a plurality of light sources mounted on the substrate;*

*a reflection layer disposed on the substrate through the plurality of light sources;*

*a transparent film disposed above the reflection layer;*

*a resin layer formed between the reflection layer and the transparent film; and*

*a plurality of reflection patterns formed on the transparent film to correspond to a position of each light source,*

*wherein each reflection pattern is formed with a different material from the resin and by printing the transparent film with a plurality of dots,*

*wherein a center of at least one reflection pattern is disposed a predetermined distance from a center of a corresponding closest light source in a lateral direction, and*

*wherein a width of each of the plurality of reflection patterns in the lateral direction is greater than a width of the corresponding closest light source in the lateral direction.*

*28. The backlight unit according to claim 27, wherein a density of the plurality of dots is gradually smaller from a center of each reflection pattern to its outer area.*

*29. The backlight unit according to claim 27, wherein each reflection pattern is an embossed pattern.*

*30. The backlight unit according to claim 27, wherein each reflection pattern has a circle shape centering on an area of a corresponding light source.*

*31. The backlight unit according to claim 27, wherein each reflection pattern has a circle shape off-centered from an area of a corresponding light source.*

*32. The backlight unit according to claim 27, wherein each reflection pattern has a rectangle shape centering on an area of a corresponding light source.*

*33. The backlight unit according to claim 27, wherein a gap between outer rows of each reflection pattern and adjacent rows increases from a center of each reflection pattern to its outer area.*

*34. The backlight unit according to claim 27, wherein each light source comprises:*

*a LED chip;*

*a mold part packaging the LED chip; and*

*a concave lens formed at a center of the mold part and enclosing the LED chip.*

*35. A display apparatus, comprising:*

*a display panel positioned above a backlight unit, wherein the backlight unit includes:*

*a substrate;*

*a plurality of light sources mounted on the substrate;*

*a reflection layer disposed on the substrate through the plurality of light sources;*

*a transparent film disposed above the reflection layer;*

*a resin layer formed between the reflection layer and the transparent film; and*

*a plurality of reflection patterns formed on the transparent film to correspond to a position of each light source,*

*wherein each reflection pattern is formed with a different material from the resin and by printing the transparent film with a plurality of dots,*

*wherein a center of at least one reflection pattern is disposed a predetermined distance from a center of a corresponding closest light source in a lateral direction, and*

*wherein a width of each of the plurality of reflection patterns in the lateral direction is greater than a width of the corresponding closest light source in the lateral direction.*

*36. The display apparatus according to claim 35, wherein a density of the plurality of dots is gradually smaller from a center of each reflection pattern to its outer area.*

*37. The display apparatus according to claim 35, wherein each reflection pattern is an embossed pattern.*

*38. The display apparatus according to claim 35, wherein each reflection pattern has a circle shape centering on an area of a corresponding light source.*

*39. The display apparatus according to claim 35, wherein each reflection pattern has a circle shape off-centered from an area of a corresponding light source.*

*40. The display apparatus according to claim 35, wherein each reflection pattern has a rectangle shape centering on an area of a corresponding light source.*

*41. The display apparatus according to claim 35, wherein a gap between outer rows of each reflection pattern and adjacent rows increases from a center of each reflection pattern to its outer area.*

*42. The display apparatus according to claim 35, wherein each light source comprises:*

*a LED chip;*

*a mold part packaging the LED chip; and*

*a concave lens formed at a center of the mold part and enclosing the LED chip.*

* * * * *